United States Patent
Kishigami et al.

(10) Patent No.: US 9,664,777 B2
(45) Date of Patent: May 30, 2017

(54) RADAR DEVICE

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 742 days.

(21) Appl. No.: 13/881,335

(22) PCT Filed: Nov. 2, 2011

(86) PCT No.: PCT/JP2011/006150
§ 371 (c)(1),
(2), (4) Date: Apr. 24, 2013

(87) PCT Pub. No.: WO2012/066737
PCT Pub. Date: May 24, 2012

(65) Prior Publication Data
US 2013/0241766 A1    Sep. 19, 2013

(30) Foreign Application Priority Data

Nov. 16, 2010    (JP) ................................. 2010-256143

(51) Int. Cl.
*G01S 7/28*    (2006.01)
*G01S 7/02*    (2006.01)
(Continued)

(52) U.S. Cl.
CPC ............ *G01S 7/023* (2013.01); *G01S 7/2813* (2013.01); *G01S 13/284* (2013.01);
(Continued)

(58) Field of Classification Search
CPC ........ G01S 13/87; G01S 13/878; G01S 7/2813
See application file for complete search history.

(56) References Cited

U.S. PATENT DOCUMENTS 2,881,421 A * 4/1959 Grosjean .................. G01S 1/02
    327/141
3,243,814 A * 3/1966 Massey .................. G01S 13/22
    342/202
(Continued)

FOREIGN PATENT DOCUMENTS

GB    1427164 A  * 3/1976  ............. G01S 7/023
JP    58-189570 A    11/1983
(Continued)

OTHER PUBLICATIONS

Budisin, "New Complementary Pairs of Sequences," Electronic Letters 26(13): 881-883, Jun. 21, 1990.
(Continued)

*Primary Examiner* — Matthew M Barker
(74) *Attorney, Agent, or Firm* — Seed Intellectual Property Law Group LLP

(57) ABSTRACT

Under control of a first transmission code controlling section, a first radar transmitting section periodically transmits a first radar transmission signal with a first transmission period based on a first transmission trigger signal produced after elapse of a first delay time period from reception of a predetermined synchronization establishment signal by a first transmission trigger signal producing section. Under control of a second transmission code controlling section, a second radar transmitting section periodically transmits a second radar transmission signal with a second transmission period similarly. In accordance with the first delay time period and the second delay time period, arrival times of interference signals from the first radar transmitting section and the second radar transmitting section are within transmission zones of the second radar transmission signal and the first radar transmission signal.

17 Claims, 25 Drawing Sheets

(51) Int. Cl.
  *G01S 13/28* (2006.01)
  *G01S 13/93* (2006.01)
  *G01S 7/288* (2006.01)

(52) U.S. Cl.
  CPC ..... *G01S 13/931* (2013.01); *G01S 2007/2886* (2013.01); *G01S 2013/936* (2013.01)

(56) References Cited

U.S. PATENT DOCUMENTS

| | | | | |
|---|---|---|---|---|
| 3,911,432 | A | * | 10/1975 | Williams ................ G01S 13/87 342/59 |
| 4,010,468 | A | * | 3/1977 | Fishbein ................ G01S 13/02 342/59 |
| 5,920,279 | A | * | 7/1999 | Andersson .............. G01S 7/282 342/198 |
| 6,888,491 | B2 | * | 5/2005 | Richter .................. G01S 7/023 342/129 |
| 7,439,903 | B2 | * | 10/2008 | Watanabe ................ G01S 7/36 342/159 |
| 2006/0262009 | A1 | | 11/2006 | Watanabe et al. |

FOREIGN PATENT DOCUMENTS

| | | | |
|---|---|---|---|
| JP | 04-074988 A | | 3/1992 |
| JP | 7-333328 A | | 12/1995 |
| JP | 2005-291806 A | | 10/2005 |
| JP | 2006-322897 A | | 11/2006 |
| JP | 2010203918 A | * | 9/2010 ............. G01S 13/34 |

OTHER PUBLICATIONS

Bussgang et al., "A Unified Analysis of Range Performance of CW, Pulse, and Pulse Doppler Radar," Proceedings of the IRE 47(10): 1753-1762, 1959.

International Search Report, dated Jan. 10, 2012, for International Application No. PCT/JP2011/006150, 2 pages.

* cited by examiner

FIG. 1
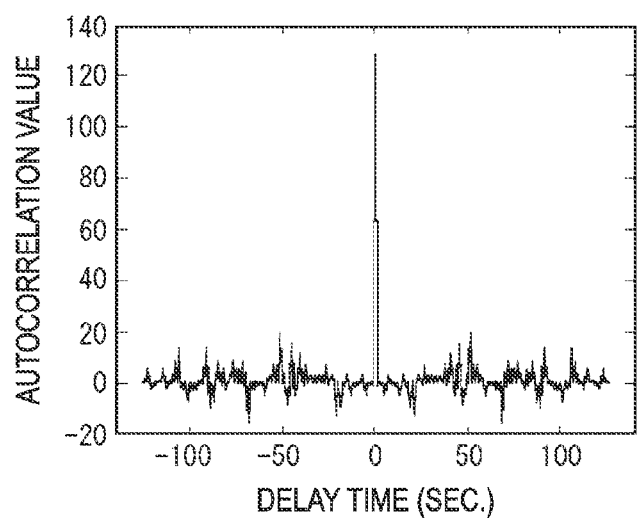
(a)
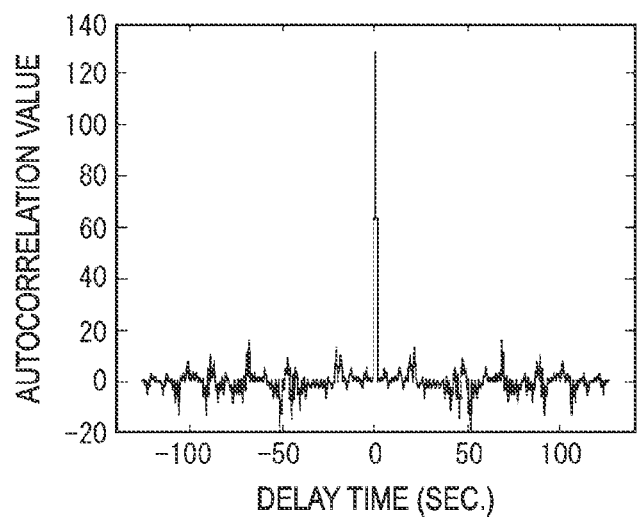
(b)
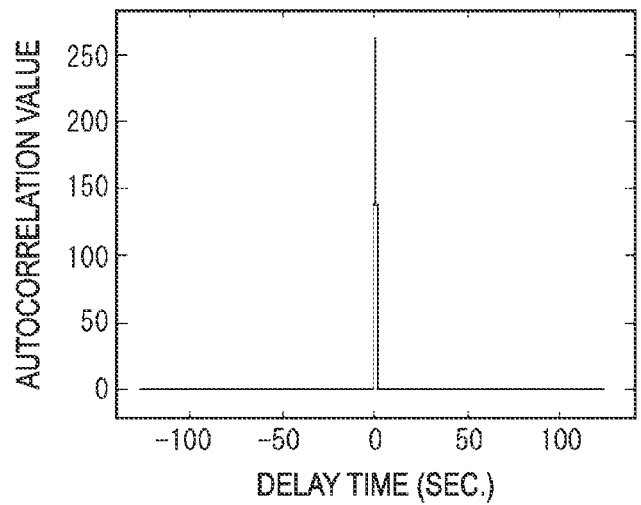
(c)

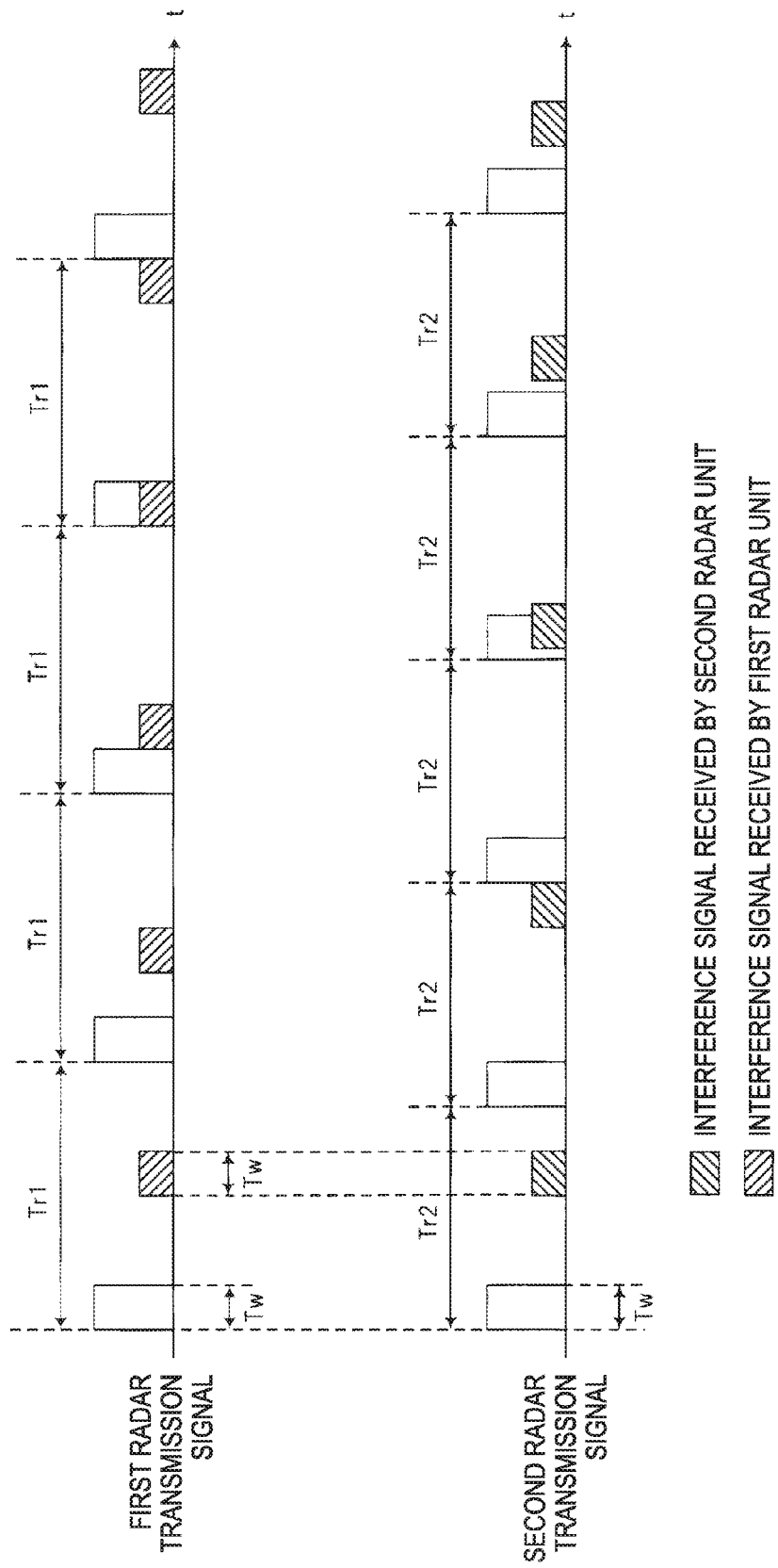

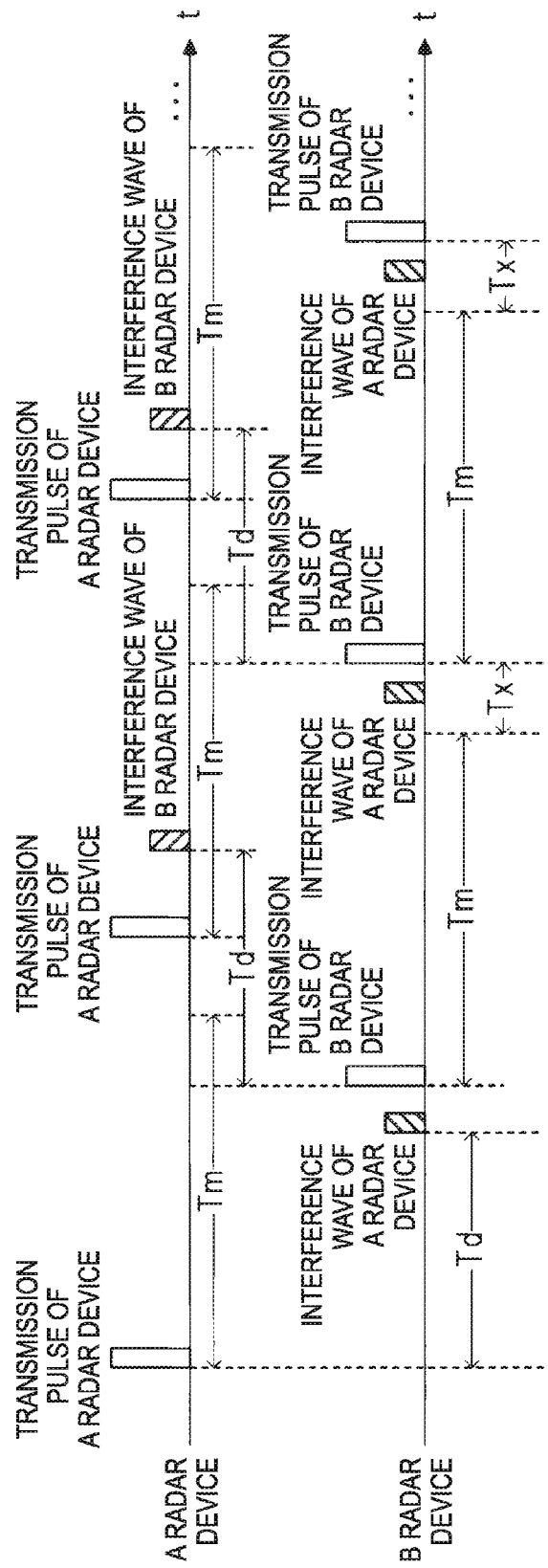
FIG. 25 -- PRIOR ART --

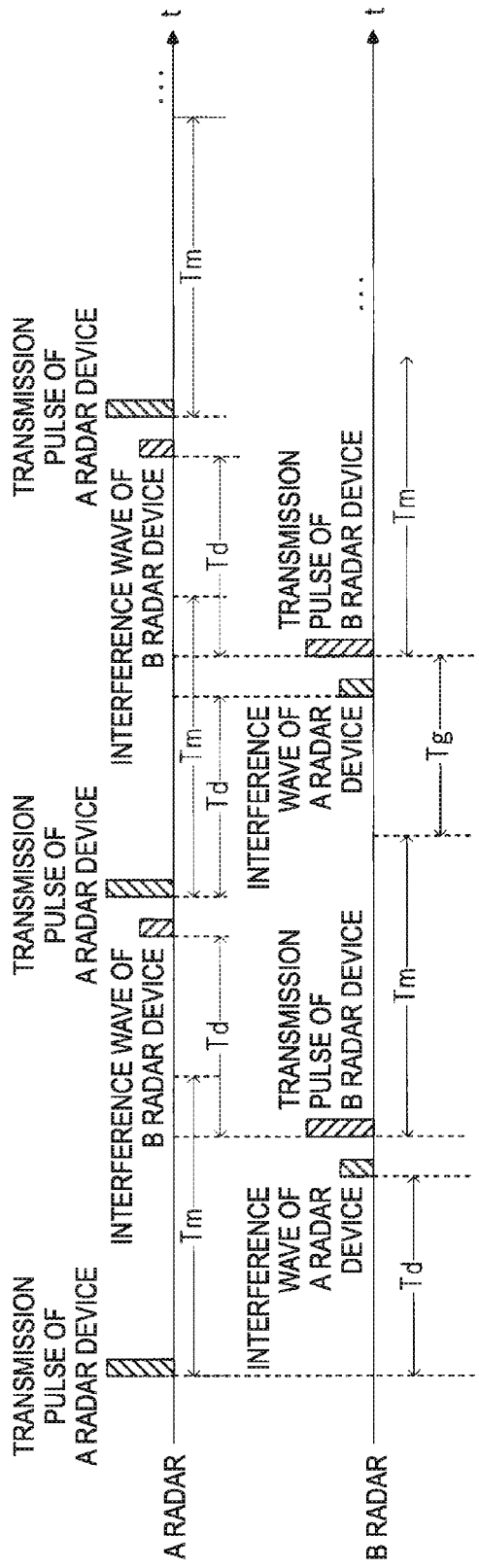
FIG. 26 -- PRIOR ART --

RADAR DEVICE

TECHNICAL FIELD

The present invention relates to a radar device which has a plurality of radar units, and in which signals of reflected waves produced when radar transmission signals transmitted from the radar units that measure respective measurement areas are reflected from the object are received by reception antennas of the radar units, thereby detecting the target.

BACKGROUND ART

A radar device radiates a radio wave from a measuring point into a space, receives a signal of a reflected wave that is reflected from a target, and measures the distance between the measuring point and the target, the direction, and the like. Recently, particularly, a radar device which can detect not only an automobile, but also a pedestrian or the like as a target by a high-resolution measurement using a short-wavelength radio wave such as a microwave or a millimeter wave has been developed.

Moreover, a radar device sometimes receives a signal in which a reflected wave from a target at a short distance and that from a target at a long distance are mixed with each other. In the case where a range side lobe is produced by a signal of a reflected wave from a target at a short distance, particularly, the range side lobe is sometimes mixed with a main lobe of a signal of a reflected wave from a target at a long distance. In this case, the accuracy of detection in which the radar device detects the target at a long distance may be impaired.

In the case where an automobile and a pedestrian are at the same distance from a measuring point, moreover, a radar device sometimes receives a signal in which signals of reflected wave from the automobile and pedestrian having different radar cross sections (RCS) are mixed with each other. Usually, the radar cross section of a pedestrian is smaller than that of an automobile.

Therefore, a radar device is requested to, even in the case where an automobile and a pedestrian are at the same distance from a measuring point, properly receive not only a reflected wave from the automobile, but also that from the pedestrian. As described above, a radar device is requested to have a reception dynamic range which is so wide that signals of reflected waves reflected from targets that cause various reception levels depending on the distance and kind of a target can be received.

Therefore, a radar device which must perform a high-resolution measurement on a plurality of targets is requested to transmit a pulse wave or pulse modulated wave having characteristics in which the autocorrelation characteristics are in the low range side lobe level (hereinafter, referred to as "low range side lobe characteristics").

As an example of the above-described radar device, known is a radar device which has a plurality of radar units, and in which the radar units independently measure respective predetermined measurement areas to measure a wide-angle range as a whole, thereby detecting a target. In the following description, each of radar devices which, in detection of a target, measure respectively different predetermined measurement areas is referred to as "radar unit." Measurement areas of radar units are different from each other, but, in the case where the measurement areas are in proximity to each other, may sometimes partly overlap each other.

In a conventional radar device, in the case where measurement areas of radar units are in proximity to each other, interference occurs between transmission signals transmitted from the radar units. When interference occurs between transmission signals in a conventional radar device, there is a problem in that accuracy of position estimation of a target is impaired.

For example, Patent Document 1 is known which discloses an apparatus that reduces interference between transmission signals of radar units in order to solve the problem. An outline of the conventional radar device disclosed in Patent Document 1 will be described with reference FIG. 25. FIG. 25 is a view showing a timing chart illustrating the operation of the conventional radar device.

The radar device of Patent Document 1 has two radar devices or A radar device and B radar device. The A radar device has a synchronizing section which controls the timing of A pulse signal that is to be emitted from the A radar device, and an I/F section which receives B synchronous trigger signal synchronized with B pulse signal that is emitted from the B radar device. The A radar device receives the B synchronous trigger signal through the I/F section. The A radar device controls the timing of emission of the A pulse signal to be emitted by the A radar device, based on the received B synchronous trigger signal.

As a result of this control, as shown in FIG. 25, the arrival time period of the interference wave of the A radar device, i.e., an interference signal which is received as the interference wave of the A radar device by the B radar device is fixed to the outside (Tx) of the time interval of the reception effective period of the B radar device. Therefore, the interference wave from the A radar device which is received by the B radar device does not affect the measurement of the B radar device.

Moreover, the arrival time period of the interference wave of the B radar device, i.e., an interference signal which is received as the interference wave of the B radar device by the A radar device is within the reception effective period of the A radar device. However, it is assumed that the A radar device performs a limited interference suppressing or gating process on the interference signal, thereby enabling the interference signal to be effectively removed. In FIG. 25, the parameter Tm indicates the reception effective period, the parameter Tx indicates the time interval between reception effective periods, and the parameter Td indicates the time period elapsed before arrival of an interference wave from another radar device.

PRIOR ART REFERENCE

Patent Document

Patent Document 1: JP-A-7-333328

SUMMARY OF THE INVENTION

Problems that the Invention is to Solve

In Patent Document 1, in order that the A radar device suppresses the interference wave from the B radar device, however, an additional circuit for suppressing the interference, such as a filter circuit must be further disposed in the A radar device. This causes a problem in that the configuration of the A radar device, particularly, that of the receiving unit is complicated. Alternatively, the A radar device performs a gating process on the interference wave from the B radar device. In the alternative, a problem is caused in that a measurement disabled region corresponding to the reception time of the interference wave from the B radar device is generated in the reception effective period Tm of the A radar device.

In order to avoid the above-discussed problems, i.e., the complication of the receiving unit of the A radar device, and the generation of a measurement disabled region in the reception effective period of the A radar device from occurring, a method may be considered in which timings when interference waves arrive from the radar devices are set outside the respective reception effective periods. The method will be described with reference to FIG. 26. FIG. 26 is a timing chart illustrating the operations of the radar devices in the case where timings when interference waves arrive from the radar devices are set outside the respective reception effective periods. In FIG. 26, the parameter Tm indicates the reception effective period, the parameter Tg indicates the time interval between reception effective periods, and the parameter Td indicates the time period elapsed before arrival of an interference wave from another radar device.

In FIG. 26, after elapse of the arrival time Td of the interference wave from the A radar device, the B radar device starts emission of a transmission pulse in the B radar device. Similarly, after elapse of the arrival time Td of the interference wave from the B radar device, the A radar device starts emission of a transmission pulse in the A radar device. In this case, the time interval Tg between reception effective periods in FIG. 26 is larger than the time interval Tx between reception effective periods in FIG. 25, and, in FIG. 26, the measurement time periods in the radar devices become longer as a whole. In each of the radar devices, therefore, the measurement number per predetermined time period is reduced, and a problem in that the distance measurement accuracy of the radar device is lowered is newly raised.

The invention has been conducted in view of the above-discussed conventional circumstances. It is an object of the invention to provide a radar device in which, when a plurality of radar units are disposed, with respect to the reception signal level of the own radar unit, the level of an interference signal from another radar unit is effectively suppressed, and the measurement time period and additional circuit that are required for the suppression are prevented from being increased.

Means for Solving the Problems

The invention is the above-described radar device wherein the apparatus includes: a first transmission trigger signal producing section which produces a first transmission trigger signal after elapse of a first delay time period from reception of a predetermined synchronization establishment signal; a first transmission code controlling section which, based on the produced first transmission trigger signal, performs a control so as to produce a first radar transmission signal for each first transmission period; a first radar transmitting section which periodically transmits the produced first radar transmission signal; a second transmission trigger signal producing section which produces a second transmission trigger signal after elapse of a second delay time period from reception of the predetermined synchronization establishment signal; a second transmission code controlling section which, based on the produced second transmission trigger signal, performs a control so as to produce a second radar transmission signal for each second transmission period; and a second radar transmitting section which periodically transmits the produced second radar transmission signal, and, in accordance with the first delay time period and the second delay time period, the first transmission code controlling section and the second transmission code controlling section control the first radar transmitting section and the second radar transmitting section so that arrival times of interference signals from the first radar transmitting section and the second radar transmitting section are within transmission zones of the second radar transmission signal and the first radar transmission signal.

Advantageous Effects of the Invention

According to the radar device of the invention, when a plurality of radar units are placed, with respect to the reception signal level of the own radar unit, the level of an interference signal from another radar unit are effectively suppressed, and the measurement time period and additional circuit that are required for the suppression can be prevented from being increased.

BRIEF DESCRIPTION OF THE DRAWINGS

FIG. 1 shows views illustrating the characteristics of a complementary code, (a) is a view showing results of autocorrelation calculations of one complementary code sequence, (b) is a view showing results of autocorrelation calculations of the other complementary code sequence, and (c) is a view showing an additional value of the results of autocorrelation calculations of the two complementary code sequences.

FIG. 24 is a timing chart illustrating the operations of the radar units in the wide-angle radar device of Modification 4 of the first embodiment.

FIG. 25 is a timing chart illustrating the operation of a conventional radar device.

FIG. 26 is a timing chart illustrating the operations of radar devices in the case where arrival time period of interference waves from the radar devices are set outside respective reception effective periods.

MODE FOR CARRYING OUT THE INVENTION

Figure 2:
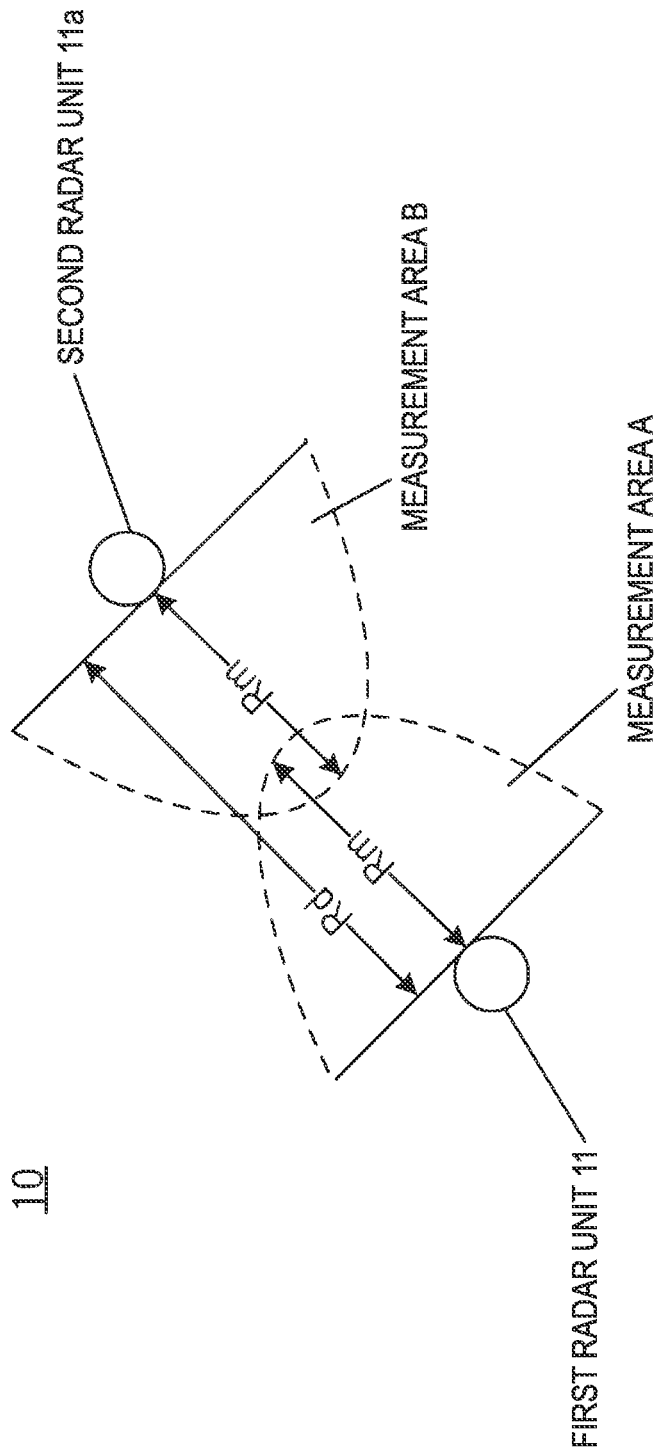
FIG. 2 is a diagram showing arrangement relationships of radar units in a wide-angle radar device of a first embodiment.

Prior to description of embodiments of the radar device of the invention, hereinafter, the pulse compression process and a complementary code will be briefly described as the technical knowledge which is the premise of the embodiments described later.

For example, a pulse compression radar is known in which, as a pulse wave or pulse modulated wave having the above-described low range side lobe characteristics, a high-frequency radar transmission signal is transmitted by using a code containing the Barker code sequence, the M sequence code, or the complementary code.

The pulse compression means that a pulse signal is pulse-modulated or phase-modulated, transmission is performed by using a signal having a wide pulse width (pulse compression code), and, in signal processing after reception of a reflected wave, the received signal is demodulated and converted (compressed) to a signal having a narrow pulse width, to calculate the correlation value. According to the pulse compression, the reception power can be equivalently enhanced, and the target detectable distance can be increased. Moreover, the distance estimation accuracy with respect to the detectable distance can be improved.

Here, a complementary code is a code configured by a plurality of, for example, two complementary code sequences (an, bn), and has characteristics that, considering results of autocorrelation calculations of one complementary code sequence an and the other complementary code sequence bn, in the case where the results of autocorrelation calculations are added together while the delay time periods τ [sec.] are made consistent with each other, the range side lobe is zero. The parameter n is n=1, 2, . . . , L. The parameter L indicates the code sequence length, or simply the code length.

A method of producing a complementary code is disclosed in, for example, following Reference Non-patent Document 1.

(Reference Non-patent Document 1) BUDISIN, S. Z, "NEW COMPLEMENTARY PAIRS OF SEQUENCES", Electron Lett., 26, (13), pp. 881-883 (1990)

The characteristics of such a complementary code will be described with reference to FIG. 1. FIG. 1 shows views illustrating the characteristics of a complementary code. In the figure, (a) is a view showing results of the autocorrelation calculation of the one complementary code sequence an, (b) is a view showing results of the autocorrelation calculation of the other complementary code sequence bn, and (c) is a view showing an additional value of the results of the autocorrelation calculations of the two complementary code sequences (an, bn). The code length L of the complementary codes used in FIG. 1 is 128.

The result of the autocorrelation calculation of the one complementary code sequence an of the two complementary code sequences (an, bn) is calculated in accordance with Exp. (1). The result of the autocorrelation calculation of the other complementary code sequence bn is calculated in accordance with Exp. (2). The parameter R represents the result of the autocorrelation calculation. In the case where n>L or n<1, the complementary code sequences an, bn are set to zero (i.e., when n>L or n<1, an=0, bn=0). The asterisk * represents a complex conjugate operator.

[Exp. 1]
$$R_{aa}(\tau) = \sum_{n=1}^{L} a_n a_{n+\tau}^* \quad (1)$$

[Exp. 2]
$$R_{bb}(\tau) = \sum_{n=1}^{L} b_n b_{n+\tau}^* \quad (2)$$

As shown in FIG. 1(a), in the result Raa(τ) of the autocorrelation calculation of the complementary code sequence an calculated in accordance with Exp. (1), a peak exists when the delay time period (or the shift time period) τ is zero, and a range side lobe exists when the delay time period τ is not zero. Similarly, as shown in FIG. 1(b), in the result Rbb(τ) of the autocorrelation calculation of the complementary code sequence bn calculated in accordance with Exp. (2), a peak exists when the delay time period τ is zero, and a range side lobe exists when the delay time period τ is not zero.

As shown in FIG. 1(c), in the additional value of the results (Raa(τ), Rbb(τ)) of the autocorrelation calculations, a peak exists when the delay time period τ is zero, and a range side lobe does not exist and is zero when the delay time period τ is not zero. Hereinafter, the peak occurring when the delay time period τ is zero is referred to as "main lobe." The relationship is expressed by Exp. (3). In FIGS. 1(a) to (c), the abscissa indicates the delay time period (τ) in the autocorrelation calculation, and the ordinate indicates the calculated result of the autocorrelation calculation.

[Exp.3]

$$R_{aa}(\tau)+R_{bb}(\tau)\neq 0, \text{ when } \tau=0$$

$$R_{aa}(\tau)+R_{bb}(\tau)=0, \text{ when } \tau\neq 0 \qquad (3)$$

In the case where a signal in which a reflected wave from a target at a short distance and that from a target at a long distance are mixed with each other is received, it is known that the longer the code length of a pulse compression code is, the larger a required reception dynamic range is.

In a complementary code, because of the above-described autocorrelation characteristics, the peak side lobe can be reduced with a shorter code length. In a complementary code in which a short code length is used, in the case where a signal in which a reflected wave from a target at a short distance and that from a target at a long distance are mixed with each other is received, therefore, the reception dynamic range can be reduced.

In the case where the Barker code sequence or M sequence code having a code length L is used, the peak side lobe ratio can be given by 20 log 10(1/L) [dB]. When the code length L is increased, excellent low rage side lobe characteristics are obtained.

Hereinafter, embodiments of the invention will be described with reference to the drawings. FIG. 2 is a diagram showing arrangement relationships of radar units in a wide-angle radar device 10 of a first embodiment. In the following description, the wide-angle radar device 10 of the invention includes a plurality of, for example, two radar units (a first radar unit 11, a second radar unit 11a) as shown in FIG. 2.

A reception signal received by each of the radar units contains a signal of a reflected wave which is obtained by reflecting a radar transmission signal transmitted from the own radar unit, from a target, and a radar transmission signal (interference signal) which is transmitted from the other radar unit, and which functions as an interference wave. The transmission signal transmitted from the first radar unit 11 is referred to as the first radar transmission signal, and that transmitted from the second radar unit 11a is referred to as the second radar transmission signal. This is applicable similarly in the following embodiments.

In the following description, it is assumed that, in the radar units constituting the wide-angle radar device 10 of the invention, the measurement areas of the radar units are approximately on the same straight line, and opposed to each other so as to partly overlap each other. Namely, in the case where, in FIG. 2, the distance between the radar units is Rd, and the maximum measuring distances of the radar units are Rm, Exp. (4) holds.

Also in the embodiments described below, it is assumed that the radar units constituting the wide-angle radar device of the invention includes those in which the measurement areas of the radar units are approximately on the same straight line, and are oppositely arranged so that the measurement areas partly overlap each other.

The embodiment will be described while assuming that the maximum measuring distance of the radar units is Rm. However, the invention is not limited to this. Even in the case where the radar units have different maximum measuring distances, the invention can be similarly applied as far as the measurement areas of the radar units are approximately on the same straight line, and opposed to each other so as to partly overlap each other.

[Exp. 4]

$$1 < \frac{Rd}{Rm} < 2 \qquad (4)$$

[First Embodiment]

Figure 3:
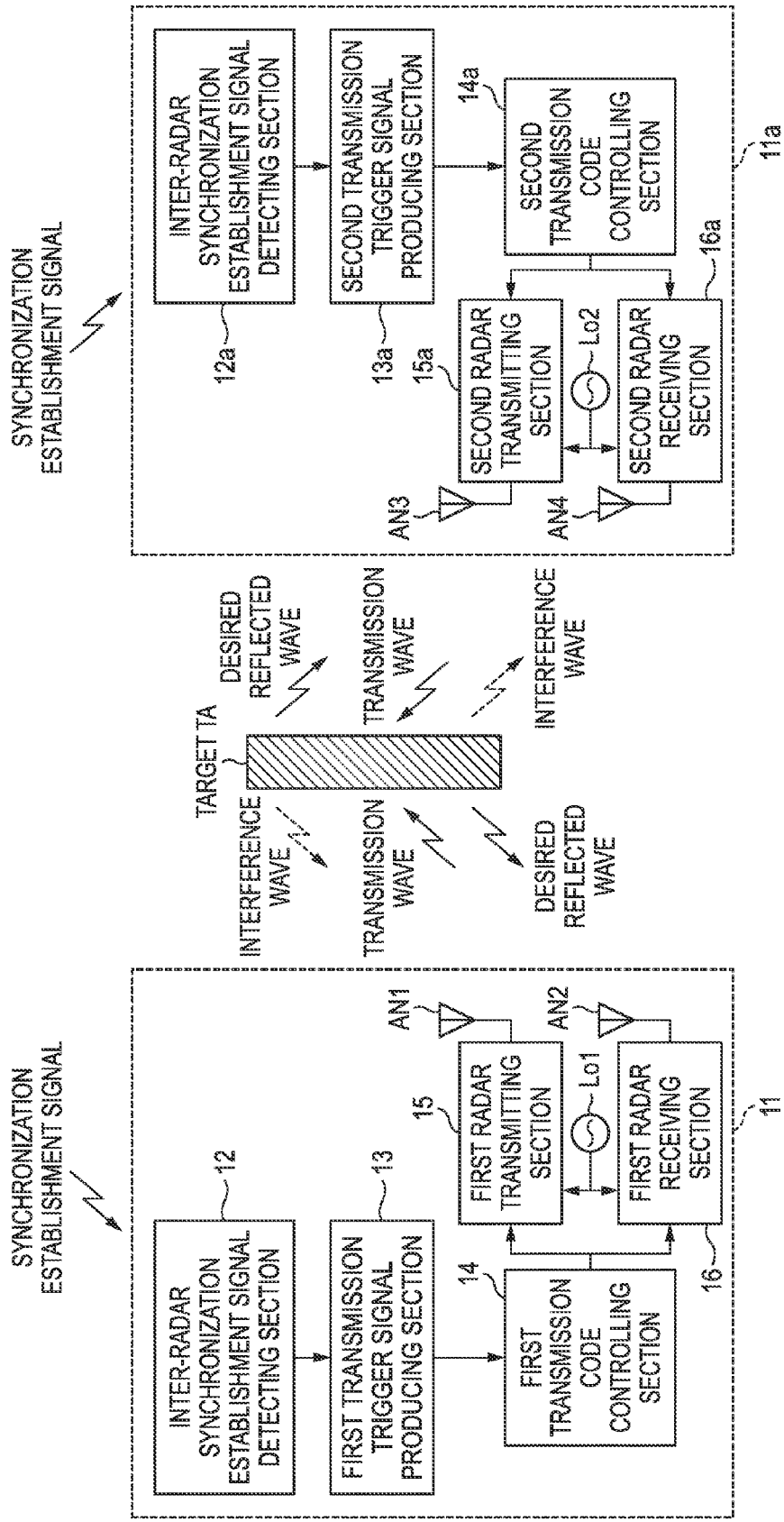
FIG. 3 is a system diagram showing the configurations of the radar units in the wide-angle radar device of the first embodiment.
Figure 4:
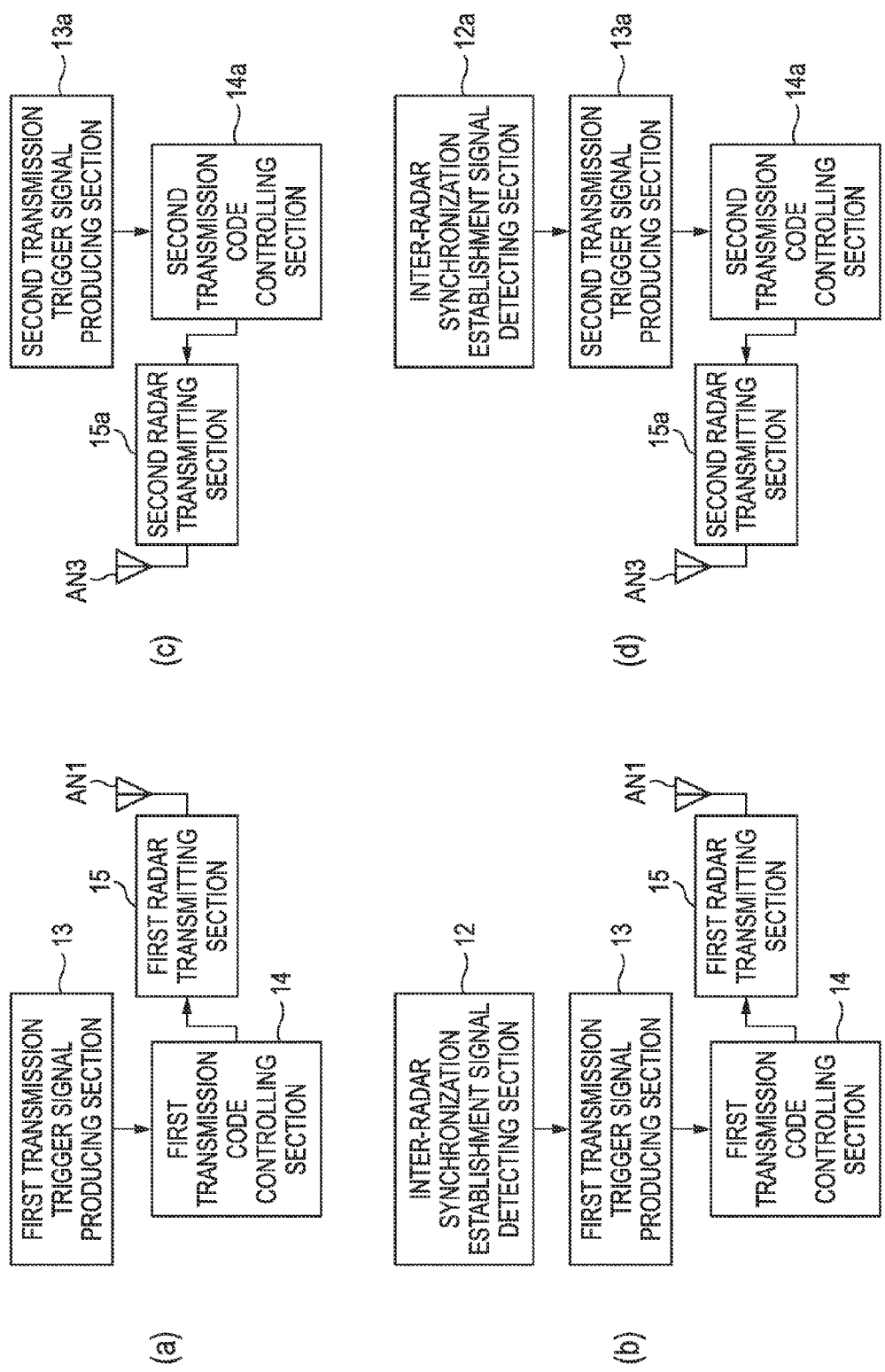
FIG. 4 shows system diagrams showing the configurations of parts of the radar units in the wide-angle radar device of the first embodiment, (a) shows a part of a first radar unit, (b) shows a further part of the first radar unit, (c) shows a part of a second radar unit, and (d) shows a further part of the second radar unit.

The configuration and operation of the wide-angle radar device 10 of the first embodiment will be described with reference to FIGS. 3 to 8. FIG. 3 is a system diagram showing the configurations of the radar units in the wide-angle radar device 10 of the first embodiment. FIG. 4 shows system diagrams showing the configuration of parts of the radar units in the wide-angle radar device 10 of the first embodiment. In the figure, (a) shows a part of the first radar unit 11, (b) shows a further part of the first radar unit 11, (c) shows a part of the second radar unit 11a, and (d) shows a further part of the second radar unit 11a. The views of FIG. 4 independently operate as radar units, respectively.

Figure 5:
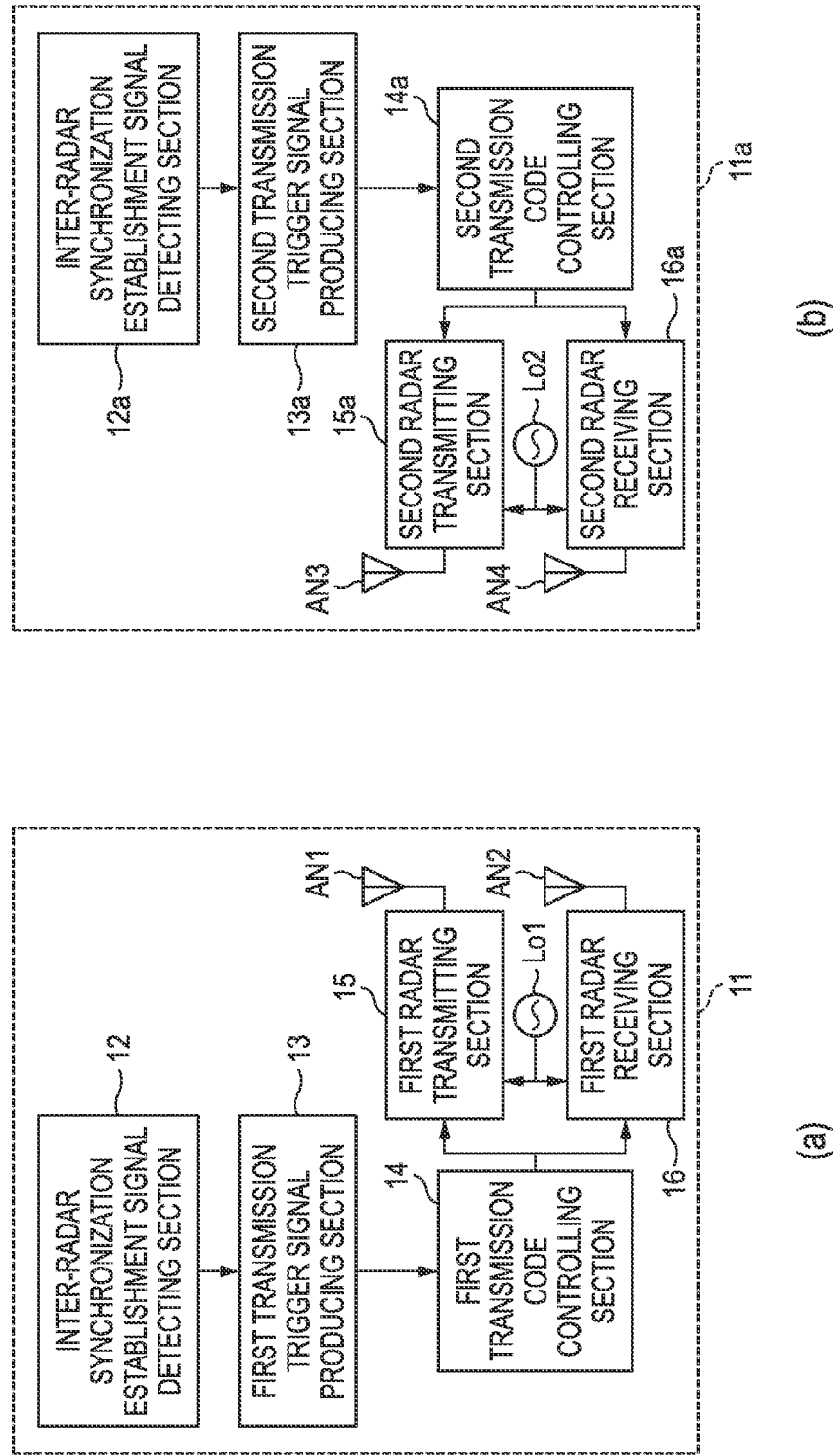
FIG. 5 shows block diagrams showing the internal configurations of the radar units of the wide-angle radar device of the first embodiment, (a) shows the first radar unit, and (b) shows the second radar unit.

FIG. 5 shows block diagrams showing the internal configurations of the radar units of the wide-angle radar device 10 of the first embodiment. In the figure, (a) shows the first radar unit 11, and (b) shows the second radar unit 11a. The views of FIG. 5 independently operate as radar units, respectively.

Figure 6:
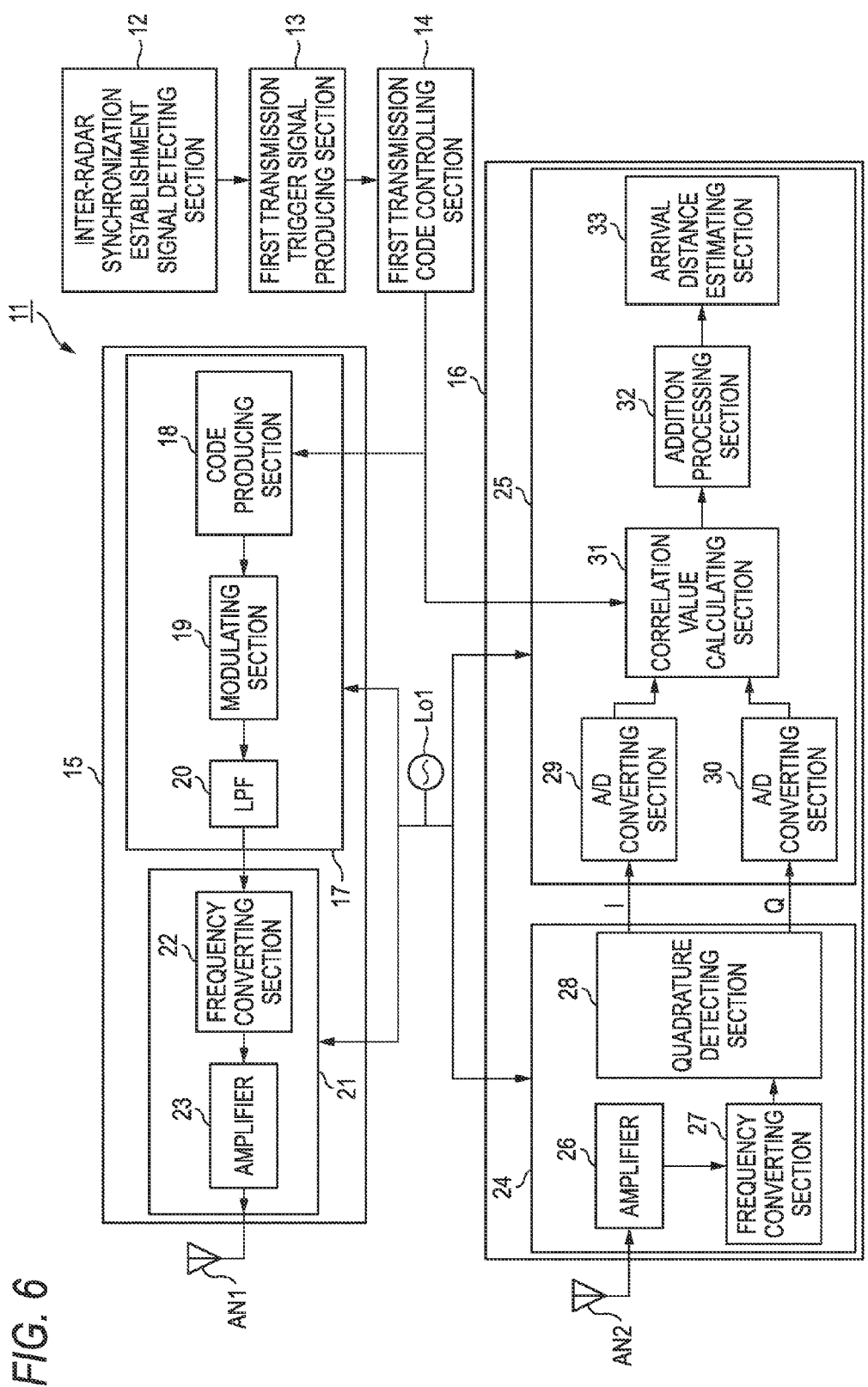
FIG. 6 is a block diagram showing in detail the internal configuration of the first radar unit in the wide-angle radar device of the first embodiment.
Figure 7:
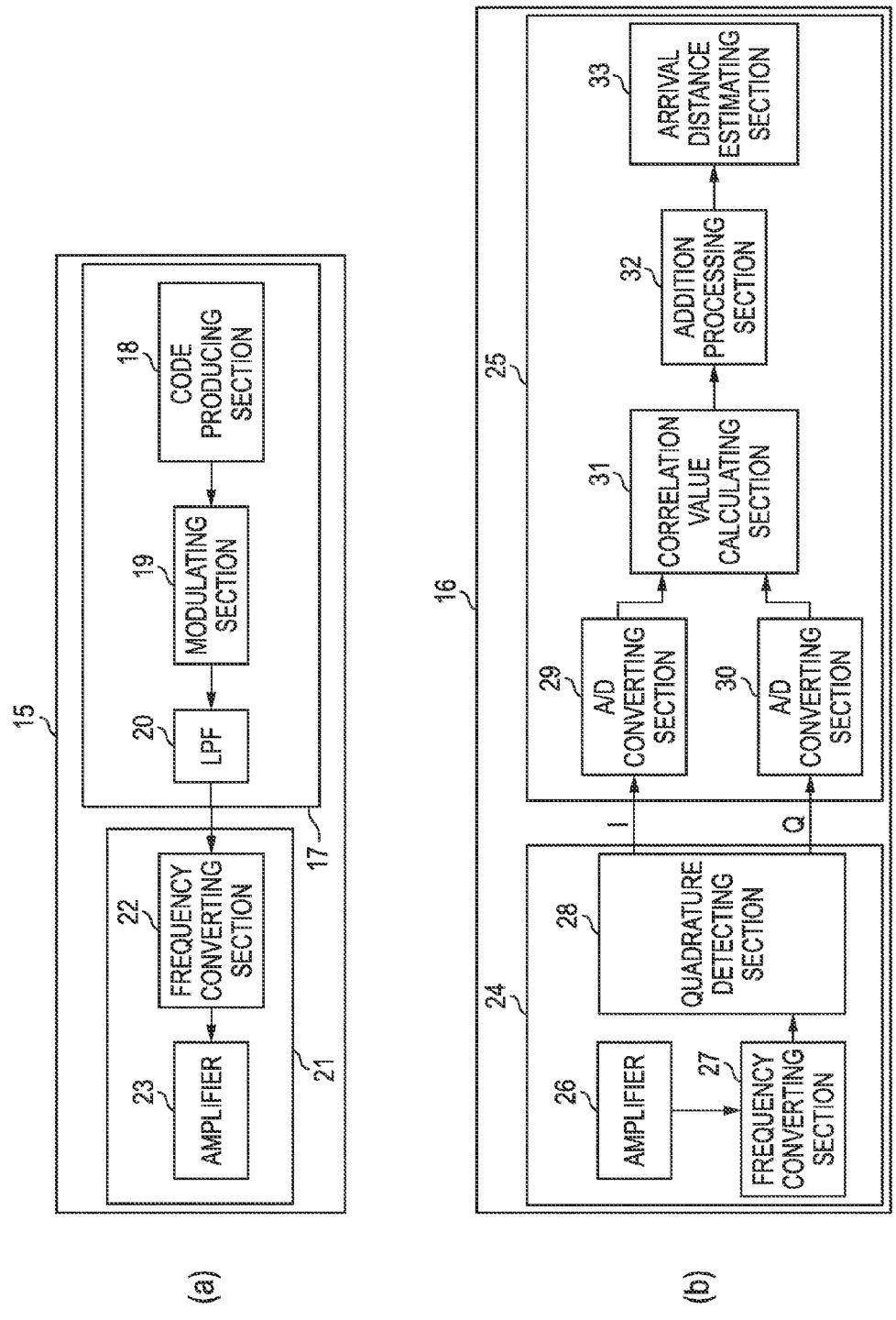
FIG. 7 shows block diagrams showing a partial configuration of the first radar unit in the wide-angle radar device of the first embodiment, (a) shows a first radar transmitting section, and (b) shows a first radar receiving section.
Figure 8:
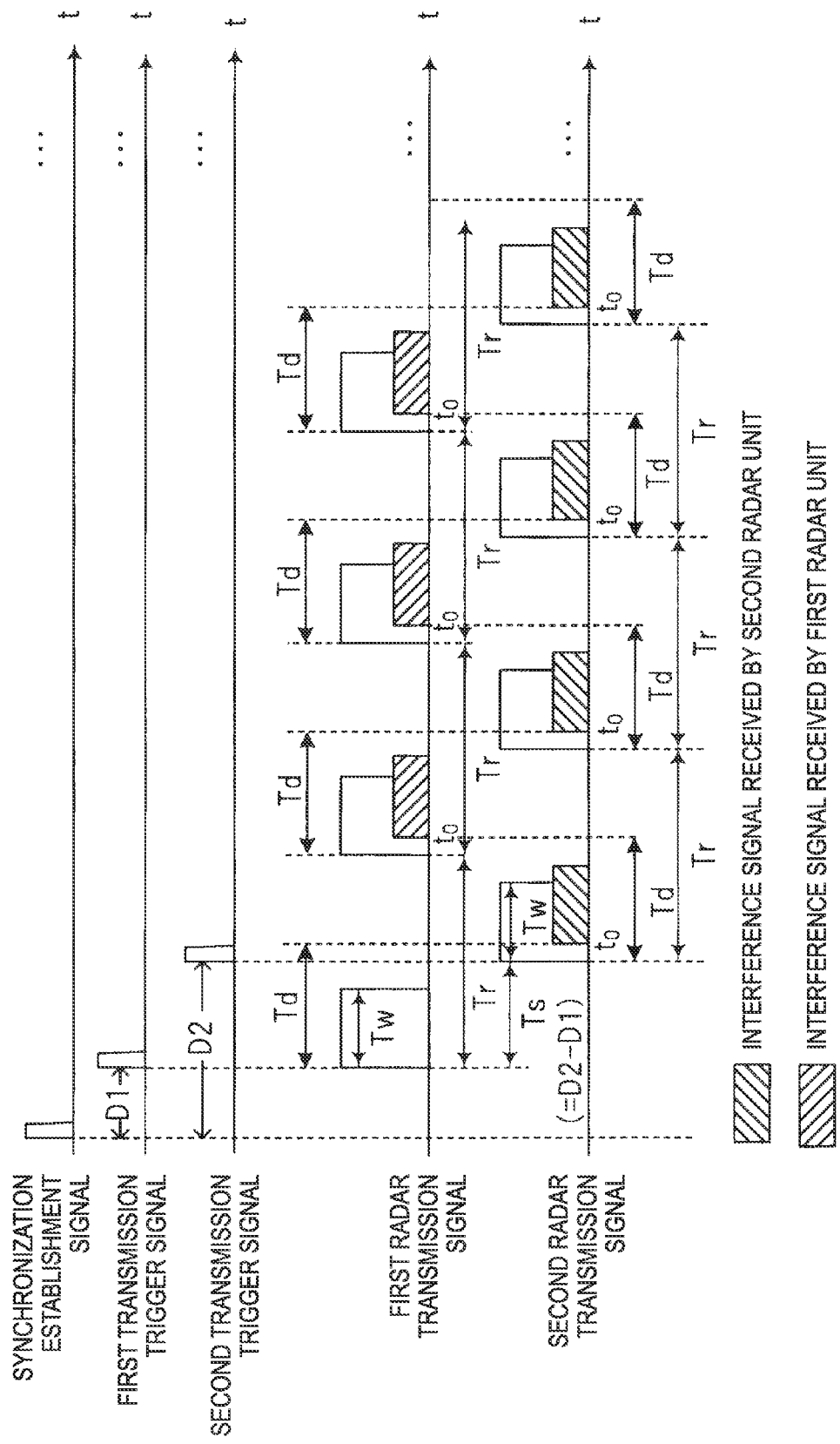
FIG. 8 is a timing chart related to the operations of the radar units in the wide-angle radar device of the first embodiment.

FIG. 6 is a block diagram showing in detail the internal configuration of the first radar unit 11 in the wide-angle radar device 10 of the first embodiment. FIG. 7 shows block diagrams showing a partial configuration of the first radar unit 11 in the wide-angle radar device 10 of the first embodiment. In the figure, (a) shows a first radar transmitting section 15, and (b) shows a first radar receiving section 16. The views of FIG. 7 independently operate as a transmitter and a receiver, respectively. FIG. 8 is a timing chart related to the operations of the radar units in the wide-angle radar device 10 of the first embodiment.

In the wide-angle radar device 10, referring to FIG. 3, the first radar unit and the second radar unit 11a produce predetermined intermittent high-frequency radar transmission signals, respectively, and transmit the signals from a transmission antenna AN1 and a transmission antenna AN3.

Furthermore, the first radar unit 11 receives a signal of a reflected wave which is obtained by reflecting the radar transmission signal transmitted from the first radar unit 11, from a target TA, and the radar transmission signal which is transmitted from the second radar unit 11a, and which functions as an interference wave, through a reception antenna AN2.

Furthermore, the second radar unit 11a receives a signal of a reflected wave which is obtained by reflecting the radar transmission signal transmitted from the second radar unit 11a, from the target TA, and the radar transmission signal which is transmitted from the first radar unit 11, and which functions as an interference wave, through a reception antenna AN4.

In the wide-angle radar device 10, moreover, the first radar unit 11 and the second radar unit 11a perform signal processing on the reception signals which are received by the first radar receiving section 16 and a second radar receiving section 16a, respectively to measure the distance. Therefore, the first radar unit 11 and the second radar unit 11a detect the presence or absence of the target TA in measurement areas A, B of the radar units.

In the case where the target TA exists, in the wide-angle radar device 10, the radar units 11, 11a measure the distances from the radar units 11, 11a to the measurement target. The target TA is an object which is to be detected by the wide-angle radar device 10, and for example an automobile or a person or the like. This is applicable similarly in the following embodiments.

As shown in FIGS. 3 and 5(a), the first radar unit 11 includes: an inter-radar synchronization establishment signal detecting section 12; a first transmission trigger signal producing section 13; a first transmission code controlling section 14, the first radar transmitting section 15 which is connected to the transmission antenna AN1; and the first radar receiving section 16 which is connected to the reception antenna AN2. Both the first radar transmitting section 15 and the first radar receiving section 16 are connected to a reference signal oscillator Lo1, and configured so that a signal from the reference signal oscillator Lo1 is supplied, and the process of the first radar transmitting section 15 is synchronized with that of the first radar receiving section 16.

As shown in FIGS. 3 and 5(b), the second radar unit 11a includes: an inter-radar synchronization establishment signal detecting section 12a; a second transmission trigger signal producing section 13a; a second transmission code controlling section 14a, a second radar transmitting section 15a which is connected to the transmission antenna AN3; and the second radar receiving section 16a which is connected to the reception antenna AN4. Both the second radar transmitting section 15a and the second radar receiving section 16a are connected to a reference signal oscillator Lo2, and configured so that a signal from the reference signal oscillator Lo2 is supplied, and the process of the second radar transmitting section 15a is synchronized with that of the second radar receiving section 16a.

The first radar unit 11 and the second radar unit 11a have a similar configuration, and operate in a similar manner. In the following description of the configuration and operation of the wide-angle radar device 10, therefore, the configuration and operation of the first radar unit 11 will be mainly described, and those of the second radar unit 11a will be described as required.

In the configuration of the second radar unit 11a, particularly, portions which are not explicitly described operate similarly as the description of the corresponding configuration of the first radar unit 11. This is applicable similarly in the following embodiments.

The inter-radar synchronization establishment signal detecting section 12 detects or receives a synchronization establishment signal which is used for synchronizing transmission timings of radar transmission signals between the first radar unit 11 and the second radar unit 11a, and which are common to the radar units. As the synchronization establishment signal, for example, a transmission signal which is transmitted from a specific base station apparatus or the like via a wired communication line such as a LAN (Local Area Network), or a wireless communication line, or that which is transmitted via a GPS (Global Positioning System) satellite may be used.

In the following description, synchronization in the synchronization establishment signal means synchronization between the radar units, i.e., the timings which are used as references in transmissions of the radar transmission signals transmitted from the radar units are identical with each other.

The first transmission trigger signal producing section 13 produces a first transmission trigger signal after elapse of a delay time period D1 specific to the first radar unit 11 from the detection or reception of the synchronization establishment signal by the inter-radar synchronization establishment signal detecting section 12 (see FIG. 8). The first transmission trigger signal is a signal which defines the timing when the first radar unit 11 produces and transmits the first radar transmission signal.

The second transmission trigger signal producing section 13a produces a second transmission trigger signal after elapse of a delay time period D2 specific to the second radar unit 11a from the detection or reception of the synchronization establishment signal by the inter-radar synchronization establishment signal detecting section 12a (see FIG. 8). The second transmission trigger signal is a signal which defines the timing when the second radar unit 11a produces and transmits the second radar transmission signal.

The first transmission code controlling section 14 controls the first radar transmitting section 15 so as to produce the first radar transmission signal for each transmission period Tr which will be described later, in accordance with the production of the first transmission trigger signal by the first transmission trigger signal producing section 13. Specifically, in accordance with the first transmission trigger signal, the first transmission code controlling section 14 outputs a transmission code control signal indicating that a first transmission signal is produced for each transmission period Tr which will be described later, to a code producing section 18 of a first transmission signal producing section 17 of the first radar transmitting section 15.

Although not illustrated, the first transmission trigger signal producing section 13 may output the first transmission trigger signal for each transmission period Tr, and the first transmission code controlling section 14 may control the first radar transmitting section 15 so as to produce the first radar transmission signal for each transmission period Tr. The transmission period may change for each period.

The first transmission code controlling section 14 further outputs the transmission code control signal indicating that the first transmission signal is produced, also to a correlation value calculating section 31 of the first radar receiving section 16 which will be described later.

The second transmission code controlling section 14a controls the second radar transmitting section 15a so as to produce the second radar transmission signal for each transmission period Tr which will be described later, in accordance with the production of the second transmission trigger signal by the second transmission trigger signal producing section 13a. Specifically, in accordance with the second transmission trigger signal, the second transmission code controlling section 14a outputs a transmission code control signal indicating that a second transmission signal is produced for each transmission period Tr which will be described later, to a code producing section 18a of a second transmission signal producing section 17a of the second radar transmitting section 15a.

Although not illustrated, the second transmission trigger signal producing section 13a may output the second transmission trigger signal for each transmission period Tr, and the second transmission code controlling section 14a may control the second radar transmitting section 15a so as to produce the second radar transmission signal for each transmission period Tr. The transmission period may change for each period.

The second transmission code controlling section 14a further outputs the transmission code control signal indicating that the second transmission signal is produced, also to a correlation value calculating section 31a of the second radar receiving section 16a which will be described later.

Next, the configuration of the first radar transmitting section 15 will be described.

As shown in FIG. 6, the first radar transmitting section 15 includes the first transmission signal producing section 17, and a transmission RF section 21 to which the transmission antenna AN1 is connected.

As shown in FIG. 6, the first transmission signal producing section 17 includes the code producing section 18, a modulating section 19, and an LPF (Low Pass Filter) 20. In FIG. 6, the first transmission signal producing section 17 is configured so as to include the LPF 20. Alternatively, the LPF 20 may be configured in the first radar transmitting section 15 independently from the first transmission signal producing section 17.

As shown in FIG. 6, the transmission RF section 21 includes a frequency converting section 22 and an amplifier 23.

Next, the configuration of the second radar transmitting section 15a will be described. The second radar transmitting section 15a is configured similarly with the first radar transmitting section 15 shown in FIG. 6, and therefore illustration of the second radar transmitting section 15a is omitted.

The second radar transmitting section 15a includes the second transmission signal producing section 17a, and a transmission RF section 21a to which the transmission antenna AN3 is connected.

The second transmission signal producing section 17a includes the code producing section 18a, a modulating section 19a, and an LPF 20a. The second transmission signal producing section 17a is configured so as to include the LPF 20a. Alternatively, the LPF 20a may be configured in the second radar transmitting section 15a independently from the second transmission signal producing section 17a.

The transmission RF section 21a includes a frequency converting section 22a and an amplifier 23a.

Next, the configurations and operations of the sections of the first radar transmitting section 15 will be described.

Based on a reference signal produced by the reference signal oscillator Lo1, the first transmission signal producing section 17 produces a signal which is obtained by multiplying the reference signal a predetermined number of times. The sections of the first transmission signal producing section 17 operate based on the produced signal.

The first transmission signal producing section 17 modulates the code sequence an having the code length of L to periodically produce a base-band first transmission signal r(k, M) (pulse compression code) indicated by Exp. (5). Here, the parameter n is n=1, . . . , L, and the parameter L indicates the code length of the code sequence an. The parameter j is an imaginary unit satisfying $j^2=-1$. The parameter k is a discrete time which satisfies k=1 to (Nr+Nu). The range of the discrete time k is similarly applicable also in the following embodiments.

The base-band first transmission signal r(k, M) indicated by Exp. (5) shows the transmission signal at the discrete time k in the M-th transmission period Tr, and indicated by a result of an addition of the in-phase component Ir(k, M) and the orthogonal component Qr(k, M) with which the imaginary unit j is multiplied.

[Exp. 5]

$$r(k,M)=Ir(k,M)+jQr(k,M) \qquad (5)$$

It is assumed that the first transmission signal produced by the first transmission signal producing section 17 is not a continuous signal. As shown in the fourth and fifth stages of FIG. 8, in the transmission zone Tw [sec.] of each transmission period Tr, for example, an No [number] of samples exist per pulse code with respect to the code sequence an having a code length of L. Therefore, an Nr (=No×L) number of samples are contained in the transmission zone Tw. It is assumed that, in the non-transmission zone (Tr−Tw) [sec.] in each transmission period Tr, an Nu [number] of samples exist as the base-band first transmission signal.

The code producing section 18 produces a transmission code for pulse compression and of the code sequence an having the code length of L, for each transmission period Tr based on the transmission code control signal output from the first transmission code controlling section 14. Preferably, the transmission code is a code sequence constituting the above-described complementary code pair, the Barker code sequence, the M sequence code, or the like.

The code producing section 18 outputs the produced transmission code of the code sequence an to the modulating section 19. Hereinafter, the transmission code of the code sequence an is referred to as the transmission code an for the sake of convenience.

The modulating section 19 receives the transmission code an output from the code producing section 18. The modulating section 19 performs pulse modulation on the input transmission code an to produce a base-band first transmission signal r(k, M). The pulse modulation is the amplitude modulation, the ASK (Amplitude Shift Keying), or the phase modulation (PSK (Phase Shift Keying). The modulating section 19 outputs a first transmission signal r(k, M) which is equal to or lower than a preset limit band in the produced first transmission signal r(k, M), to the transmission RF section 21 through the LPF 20.

Based on the reference signal produced by the reference oscillator Lo1, the transmission RF section 21 produces a signal which is obtained by multiplying the reference signal a predetermined number of times. The transmission RF section 21 operates based on the produced signal.

The frequency converting section 22 receives the first transmission signal r(k, M) produced by the first transmission signal producing section 17, and upconverts the input base-band first transmission signal r(k, M) to produce a high-frequency first radar transmission signal in the carrier frequency band. The frequency converting section 22 outputs the produced first radar transmission signal to the amplifier 23.

The amplifier 23 receives the output first radar transmission signal, amplifies the level of the input first radar transmission signal to a predetermined level, and supplies the amplified signal to the transmission antenna AN1. The amplified first radar transmission signal is transmitted so as to be radiated into the space through the transmission antenna AN1.

The transmission antenna AN1 transmits the first radar transmission signal which is output from the transmission RF section 21, so as to radiate the signal into the space. As shown in the fourth stage of FIG. 8, the first radar transmission signal is transmitted during the transmission zone Tw in the transmission period Tr, but not transmitted during the non-transmission zone (Tr−Tw). Similarly, as shown in the fifth stage of FIG. 8, the second radar transmission signal is transmitted during the transmission zone Tw in the transmission period Tr, but not transmitted during the non-transmission zone (Tr−Tw).

The signals which are obtained by multiplying a predetermined number of times the reference signals produced by the reference signal oscillators Lo1, Lo2 are commonly supplied to local oscillators which are disposed in the transmission RF sections 21, 21a and reception RF sections 24, 24a of the above-described radar units, respectively. Therefore, synchronization between the local oscillators of the transmission RF sections 21, 21a and reception RF sections 24, 24a of the radar units can be established.

Here, transmission timings of the synchronization establishment signal, first transmission trigger signal, second transmission trigger signal, first radar transmission signal, and second radar transmission signal which are described above will be described with reference to FIG. 8. As described above, the first transmission trigger signal producing section 13 produces the first transmission trigger signal after elapse of the delay time period D1 specific to the first radar unit 41 from the detection or reception of the synchronization establishment signal by the inter-radar synchronization establishment signal detecting section 12.

Similarly, the second transmission trigger signal producing section 13a produces the second transmission trigger signal after elapse of the delay time period D2 specific to the first radar unit 41 from the detection or reception of the synchronization establishment signal by the inter-radar synchronization establishment signal detecting section 12a.

The first transmission code controlling section 14 produces the first radar transmission signal at the same timing as the production of the first transmission trigger signal, and then controls the first radar transmitting section 15 so as to periodically transmit the first radar transmission signal for each predetermined transmission period Tr.

Similarly, the second transmission code controlling section 14a produces the second radar transmission signal at the same timing as the production of the second transmission trigger signal, and then controls the second radar transmitting section 15a so as to periodically transmit the second radar transmission signal for each predetermined transmission period Tr.

Each of the first transmission code controlling section 14 and the second transmission code controlling section 14a produces the radar transmission signal at rising of the first transmission trigger signal or the second transmission trigger signal. Alternatively, the radar transmission signal may be produced at the timing of falling.

Alternatively, the first transmission code controlling section 14 and the second transmission code controlling section 14a may produce the radar transmission signal after a predetermined time from the transmission trigger signal.

In the wide-angle radar device 10 of the first embodiment, the production timings of the first transmission trigger signal and the second transmission trigger signal, i.e., the delay time period D1 and delay time period D2 which are described above have a predetermined difference. After the first transmission code controlling section 14 causes the first radar transmission signal 15 to transmit the first radar transmission signal, therefore, the second transmission code controlling section 14a causes the second radar transmitting section 15a to transmit the second radar transmission signal, after elapse of a time difference (D2-D1) corresponding to the difference. In the following description, the time difference corresponding to the difference is indicated by the adjustment time period Ts. Therefore, Exp. (6) holds among the adjustment time period Ts, the delay time period D1, and the delay time period D2.

[Exp. 6]

$$Ts = D2 - D1 \quad (6)$$

The adjustment time period Ts is set so that the starting time t0 of the arrival time period Td which elapses until the interference signal from the other radar unit is received by the own radar unit is within the transmission zone Tw of the transmission period Tr of the radar transmission signal of the own radar unit. Namely, the adjustment time period Ts is set so as to satisfy Exp. (7). The parameter t0 indicates the starting time of the arrival time period Td of the interference signal from the other radar unit, i.e., the arrival time of the interference signal.

[Exp. 7]

$$Td - Tw < Ts < Td \quad (7)$$

The arrival time period Td of the interference signal from the other radar unit may be derived by actual measurement, or geometrically derived by assuming a model including a specific reflection object such as the ground on which the plurality of radar units are disposed. This is applicable similarly in the following embodiments. Moreover, the arrival time period Td of the interference signal from the other radar unit may be derived in a simplified manner in accordance with Exp. (8) from the distance Rd between the first radar unit 11 and the second radar unit 11a. This is applicable similarly in the following embodiments. The parameter C indicates the speed of light [m/sec.].

[Exp. 8]

$$Td = \frac{Rd}{C} \quad (8)$$

FIG. 8 also shows the case where the adjustment time period Ts is a time period which is a half of the transmission periods Tr of the first radar transmission signal and the second radar transmission signal. However, the adjustment time period Ts may not be a time period which is a half of the transmission period Tr (Ts≠Tr/2).

For example, the time period from the start of transmission of the first radar transmission signal to that of transmission of the second radar transmission signal is indicated by Ts21, and the time period from the start of transmission of the second radar transmission signal to that of transmission of the first radar transmission signal is indicated by Ts12. Exp. (9) holds between the parameters Ts21 and Ts12. In this case, preferably, the time period Ts21 and the time period Ts12 are set so that Exp. (10) holds.

[Exp. 9]

$$Ts_{21} + Ts_{12} = Tr \quad (9)$$

[Exp. 10]

$$Td - Tw < Ts_{21} < Td$$

$$Td - Tw < Ts_{12} < Td \quad (10)$$

FIG. 8 shows the case where the above-described time period Ts21 and time period Ts12 are equal to the arrival time period Td of the interference signal from the other radar unit (Ts21=Ts12=Td).

However, the time period Ts21 and the time period Ts12 may not be equal to each other. In this case, preferably, the above-described adjustment time period Ts is set so that the time period Ts21 and the time period Ts12 satisfy Exp. (11).

[Exp. 11]

$$Td_{12}-Tw<Ts<Td_{12}$$

$$Td_{21}-Tw<Ts<Td_{21} \qquad (11)$$

In the case where the adjustment time period Ts is not a time period which is a half of the transmission period Tr (Ts≠Tr/2), moreover, it is preferable that the above-described time period Ts21 and time period Ts12 are set so that Exps. (9) and (12) hold.

[Exp. 12]

$$Td_{21}-Tw<Ts_{21}<Td_{21}$$

$$Td_{12}-Tw<Ts_{12}<Td_{12} \qquad (12)$$

The above-described synchronization establishment signal is periodically transmitted, and, at each transmission, also the first transmission trigger signal and the second transmission trigger signal are periodically transmitted. This enables the wide-angle radar device 10 to repeat synchronization between the transmission timings of the radar transmission signals in the radar units. This is applicable similarly in the following embodiments.

Next, the configuration of the first radar receiving section 16 will be described.

As shown in FIG. 6, the first radar receiving section 16 includes the reception RF section 24 to which the reception antenna AN2 is connected, and a signal processing section 25.

The reception RF section 24 includes an amplifier 26, a frequency converting section 27, and a quadrature detecting section 28. The signal processing section 25 includes A/D converting sections 29, 30, the correlation value calculating section 31, an addition processing section 32, and an arrival distance estimating section 33. The first radar receiving section 16 periodically calculates the transmission period Tr as signal processing zones in the signal processing section 25.

Next, the configuration of the second radar receiving section 16a will be described. The second radar receiving section 16a is configured similarly with the first radar receiving section 16 shown in FIG. 6, and therefore illustration of the second radar receiving section 16a is omitted.

Similarly with the first radar receiving section 16, the second radar receiving section 16a includes the reception RF section 24a to which the reception antenna AN4 is connected, and a signal processing section 25a.

The reception RF section 24a includes an amplifier 26a, a frequency converting section 27a, and a quadrature detecting section 28a. The signal processing section 25a includes A/D converting sections 29a, 30a, a correlation value calculating section 31a, an addition processing section 32a, and an arrival distance estimating section 33a. The second radar receiving section 16a periodically calculates the transmission periods Tr as signal processing zones in the signal processing section 25a.

Next, the configurations and operations of the sections of the first radar receiving section 16 will be described.

The reception antenna AN2 receives a signal of a reflected wave which is produced by reflecting the first radar transmission signal transmitted from the first radar transmitting section 15, from the target TA, and the second radar transmission signal which is transmitted from the second radar unit 11a, and which functions as an interference wave. The reception signal which is received by the reception antenna AN2 is supplied to the reception RF section 24.

In the wide-angle radar device 10, the first radar receiving section 16 holds the one reception antenna AN2. Similarly, the second radar receiving section 16a holds the one reception antenna AN4.

Similarly with the transmission RF section 21, based on the reference signal produced by the reference signal oscillator Lo1, the reception RF section 24 produces a signal which is obtained by multiplying the reference signal the predetermined number of times. The reception RF section 24 operates based on the produced signal. Therefore, synchronization between the local oscillator of the transmission RF section 21 and a local oscillator (not shown) of the reception RF section 24 can be established.

The amplifier 26 receives the high-frequency band reception signal which is received by the reception antenna AN2, amplifies the level of the input reception signal, and supplies the amplified signal to the frequency converting section 27.

The frequency converting section 27 receives the high-frequency band signal which is output from the amplifier 26, downconverts the input high-frequency band signal to the base band, and supplies the downconverted reception signal to the quadrature detecting section 28.

The quadrature detecting section 28 performs quadrature detection on the base-band reception signal supplied from the frequency converting section 27 to produce a base-band reception signal configured by using an In-phase signal and a Quadrate signal. The quadrature detecting section 28 outputs the in-phase signal component in the produced reception signal to the A/D converting section 29, and the quadrate signal component in the produced reception signal to the A/D converting section 30.

The A/D converting section 29 performs sampling at the discrete time k on the base-band in-phase signal supplied from the quadrature detecting section 28, and converts the in-phase signal which constitutes analog data, to digital data. The A/D converting section 29 outputs the in-phase signal which is converted to digital data, to the correlation value calculating section 31.

Similarly, the A/D converting section 30 performs sampling at the discrete time k on the base-band quadrate signal supplied from the quadrature detecting section 28, and converts the quadrate signal which constitutes analog data, to digital data. The A/D converting section 30 outputs the quadrate signal which is converted to digital data, to the correlation value calculating section 31.

The reception signal which is converted by the A/D converting sections 29, 30, and which is at the discrete time k in the M-th transmission period Tr is expressed as an imaginary signal x(k, M) of Exp. (13) by using the in-phase signal I(k, M) of the reception signal and the quadrate signal Q(k, M) of the reception signal. This is applicable similarly in the following embodiments

[Exp. 13]

$$x(k,M)=I(k,M)+jQ(k,M) \qquad (13)$$

Here, the discrete time of k=1 shows the starting timing of each transmission period Tr. The discrete time of k=Nr shows the ending timing of the transmission zone Tw in each transmission period Tr. Moreover, the discrete time of k=(Nr+Nu) shows the timing immediately before the ending of each transmission period Tr.

The correlation value calculating section 31 receives the complex signal x(k, M) of the digital data output from the A/D converting sections 29, 30. The correlation value calculating section 31 establishes synchronization with the operation of the first transmission signal producing section 17, so that, similarly with the first transmission signal producing section 17, a signal which is obtained by multiplying the reference signal produced by the reference signal oscillator Lo1, a predetermined number of times is produced based on the reference signal. In FIG. 6, the input of the reference signal to the correlation value calculating section 31 is omitted.

Based on the signal which is obtained by multiplying the reference signal a predetermined number of times, the correlation value calculating section 31 periodically produces the reference first transmission signal r(k, M) of the same base band as the first transmission signal (see Exp. (5)) produced by the first transmission signal producing section 17 in accordance with the discrete time k.

Moreover, the correlation value calculating section 31 calculates a correlation value AC1 between the input complex signal x(k, M) and the produced reference first transmission signal r(k, M). In the calculation of the correlation value AC1, the complex conjugate value of the reference first transmission signal r(k, M) is used.

Specifically, in the case of each transmission period Tr shown in FIG. 8 or namely the discrete time k=1 to (Nr+Nu), the correlation value calculating section 31 calculates the correlation value AC1 in accordance with Exp. (14). The correlation value calculating section 31 outputs the correlation value AC1 which is calculated in accordance with Exp. (14), to the addition processing section 32.

[Exp. 14]

$$AC_1(k, M) = \sum_{s=1}^{Nr} x(k+s-1, M)r^*(s, M) \quad (14)$$

The addition processing section 32 receives the correlation value AC1 output from the correlation value calculating section 31. The addition processing section 32 performs additional averaging a plurality of or R times by using the correlation value AC1 which is multiplied in the M-th transmission period Tr, as a unit. The parameter R is a natural number.

Namely, the addition processing section 32 calculates an average correlation value aveAC1 while matching the timings of the discrete time k by using correlation values from the correlation value AC1(k, m) in the M-th transmission period Tr to the correlation value AC1(k, m+R−1) in the (M+1)-th transmission period Tr, as a unit. The addition processing section 32 outputs the calculated average correlation value aveAC1 to the arrival distance estimating section 33. The parameter m is a multiple of a natural number M including zero.

As a result of the operation of the addition processing section 32, the wide-angle radar device 10 further suppresses noise components, whereby the SNR (Signal Noise Ratio) can be improved, and the measurement performance related to estimation of the arrival distance of the target can be further improved.

As described above, the calculation of the correlation value calculating section 31 is performed on the discrete time k=1 to (Nr+Nu). Depending on the existing range of the target TA which is the measurement object of the wide-angle radar device 10, the measurement range (the range of k) may be further limited, for example, k=Nr to (Nr+Nu).

As a result, the wide-angle radar device 10 can reduce the calculation amount of the correlation value calculating section 31. Namely, the wide-angle radar device 10 can reduce the power consumption due to the reduction of the calculation amount by the signal processing section 25.

In this case, even in a case where the measurement in the transmission zones Tw of the first transmission signal and the second transmission signal is not performed, and the radar transmission signals propagate or turn around to directly reach the radar receiving sections, the wide-angle radar device 10 can perform measurement in which the influence of the turn around is eliminated.

The arrival distance estimating section 33 receives the average correlation value aveAC1 which is output from the addition processing section 32. The arrival distance estimating section 33 performs a calculation of estimating the distance from the first radar unit 11 to the target TA, based on the input average correlation value aveAC1. The calculation of estimating the distance to the target TA in the arrival distance estimating section 33 is a known technique, and can be realized by referring to, for example, following Reference Non-patent Document 2.

(Reference Non-patent Document 2) J. J. BUSSGANG, et al., "A Unified Analysis of Range Performance of CW, Pulse, and Pulse Dopper Rader", Proceedings of the IRE, Vol. 47, Issue 10, pp. 1753-1762 (1959)

Based on the average correlation value aveAC1 which is output from the addition processing section 32, for example, the arrival distance estimating section 33 determines the time difference between the discrete time when the average correlation value aveAC1 has the maximum value, and the transmission time of the first radar transmission signal. Based on the determined time difference, moreover, the arrival distance estimating section 33 estimates the distance from the first radar unit 11 to the target TA.

The above-described radar units have been described assuming that the radar units have one antenna AN2 or AN4 functioning as a reception antenna. In the case where each radar unit has a plurality of reception antennas as a reception antenna, however, the arrival distance estimating section 33 may estimate the arrival angle of the target TA with respect to each radar unit based on the phase difference of reception signals received by the reception antennas.

In the wide-angle radar device 10 of the first embodiment, the starting time of the first transmission period of the radar transmission signal of each radar unit is time-shifted by about the adjustment time period Ts so that the starting time t0 of the arrival time period Td of the interference signal from the other radar unit is within the transmission zone Tw of the transmission period Tr of the radar transmission signal of the own radar unit. As described above, the parameter t0 indicates the starting time of the arrival time period Td of the interference signal from the other radar unit.

Specifically, the starting time of the transmission period Tr of the second radar transmission signal is time-shifted by the adjustment time period Ts from the starting time of the transmission period Tr of the first radar transmission signal. Moreover, the starting time of the transmission period Tr of the first radar transmission signal is time-shifted by the adjustment time period Ts from the starting time of the transmission period Tr of the second radar transmission signal.

In the wide-angle radar device 10 of the first embodiment, when a plurality of radar units are opposedly disposed, with respect to the reception signal level of the own radar unit, therefore, the level of the interference signal from the other radar unit can be effectively suppressed. Specifically, the wide-angle radar device 10 can sufficiently enhance the ratio of the distance attenuation of the radar transmission signal of the other radar unit to the distance attenuation of the radar transmission signal of the own radar unit.

In the wide-angle radar device 10 of the first embodiment, moreover, the radar units transmit the radar transmission signals which are configured by using a pulse-compressed transmission code, and interference between the radar units can be further suppressed by the pulse compression process.

According to the wide-angle radar device 10 of the first embodiment, therefore, the measurement time period and additional circuit that are required for suppressing the level of the interference signal of the radar transmission signal transmitted from the other radar unit can be prevented from being increased.

In the case where the distance Rd, the transmission periods Tr, and the transmission zones Tw of the radar transmission signals satisfy Exp. (15), and the transmission periods Tr and the adjustment time period Ts satisfy Exp. (16), the amounts of mutual interference between the radar units can be made equal to each other. In this case, interference signal levels in the whole wide-angle radar device 10 can be uniformalized, and the position estimation performance of the wide-angle radar device 10 can be averagely improved.

[Exp. 15]

$$\frac{Tr}{2} < Td < \frac{Tr}{2} + Tw \quad (15)$$

in the case where the interference signal is a direct wave, Rm<Rd<Rm+CTw)

[Exp. 16]

$$Ts = \frac{Tr}{2} \quad (16)$$

In the case where the interference signal level is different depending on the radar unit, an influence of a radar unit in which the SINR is low is produced, and the rates of erroneous detection and undetection of the target TA in the whole wide-angle radar device 10 are increased. In the case where Exp. (16) above holds, however, the increase of the rates of erroneous detection and undetection of the target TA in the wide-angle radar device 10 can be reduced.

Figure 9:
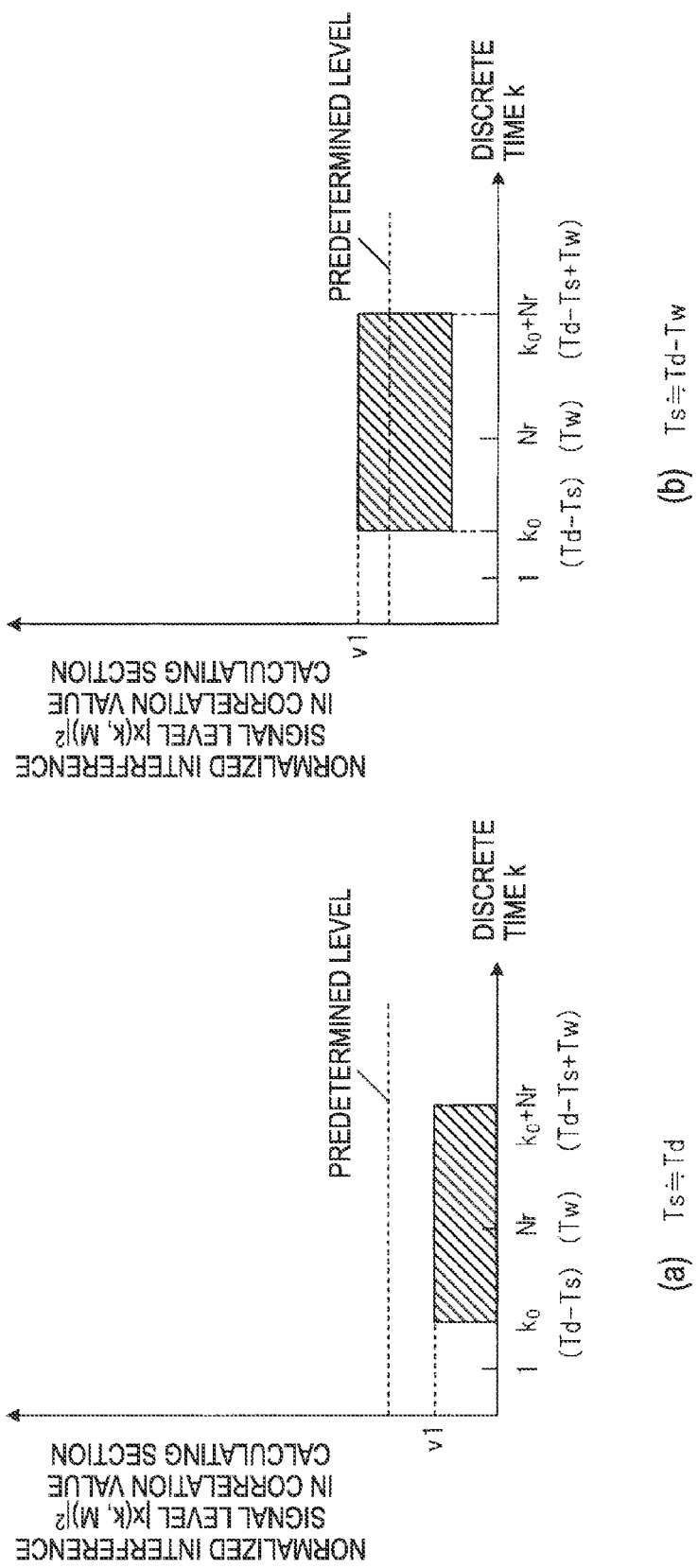
FIG. 9 shows the normalized interference signal level which is input to a correlation value calculating section, (a) shows Adjustment time period Ts≈Arrival time period Td of interference signal, (b) shows Adjustment time period Ts≈(Arrival time period Td of interference signal)−(Transmission zone Tw of radar transmission signal).

The effects of the above-described wide-angle radar device 10 of the first embodiment will be described with reference to FIGS. 9 to 11. FIG. 9 shows the normalized input level of the interference signal which is input to the correlation value calculating section 31, and (a) of the figure shows the normalized input level of the interference signal in the case where the adjustment time period Ts and the arrival time period Td of the interference signal are substantially equal to each other.

In the figure, (b) shows the normalized input level of the interference signal in the case where the adjustment time period Ts, and the difference between the arrival time period Td of the interference signal and the transmission zone Tw of the transmission period Tr are substantially equal to each other. In FIG. 9, the abscissa indicates the discrete time k, and the ordinate indicates the normalized input level of the interference signal ($|x(k, M|2)$) which is input to the correlation value calculating section 31.

In the wide-angle radar device 10, as described above, the time shift of the adjustment time period Ts is performed between the starting time of the transmission period Tr of the first radar unit 11 and that of the transmission period Tr of the second radar unit 11a.

Therefore, the wide-angle radar device 10 can suppress the normalized interference signal level in which the interference signal level from the other radar unit is normalized by the reception signal level of a desired reflected wave that is reflected by the target TA in the measurement area of the own radar unit, to a predetermined value or less. The predetermined value is a threshold which is necessary to hold the SINR for reducing impairment of the position estimation accuracy of the wide-angle radar device 10. As the level is smaller than the predetermined value, the SINR is larger.

The higher the degree of equalization between the arrival time Td of the interference signal and the adjustment time period Ts, the lower the normalized interference signal level. In accordance with this, the amount of suppression of the interference signal level becomes large. The normalized interference signal level can be expressed by Exp. (17).

[Exp. 17]

Normalized interference signal level =

$$\frac{Interferencesignallevel}{Receptionsignallevel of\ desiredreflectedwavefromtargetTA} \approx$$

in *ownmeasurementarea*

$$\left[\frac{Td - Ts}{Td}\right]^4$$

In Exp. (17), the interference signal level is inversely proportional to the fourth power of the distance R between each radar unit and the target TA. In the case where the interference signal is a direct wave, however, the interference signal level is inversely proportional to the square of the distance R between each radar unit and the target TA. Similarly, the reception signal level of a desired reflected wave from the target TA in the own measurement area (measurement area of the own radar unit) is inversely proportional to the fourth power of the distance R between each radar unit and the target TA.

As shown in (a) and (b) of FIG. 9, in the wide-angle radar device 10, therefore, the normalized interference signal level supplied to the correlation value calculating section 31 can be made equal to or lower than or approximately similar to the predetermined value level (see the dotted line). Consequently, the wide-angle radar device 10 can have the SINR which is equal to or larger than a predetermined value, and impairment of the estimation accuracy of the position of the target TA can be reduced. In FIG. 9, the parameter k0 is the discrete time indicating the starting timing of the interference region ([k=k0 to (k0+Nr)]).

Figure 10:
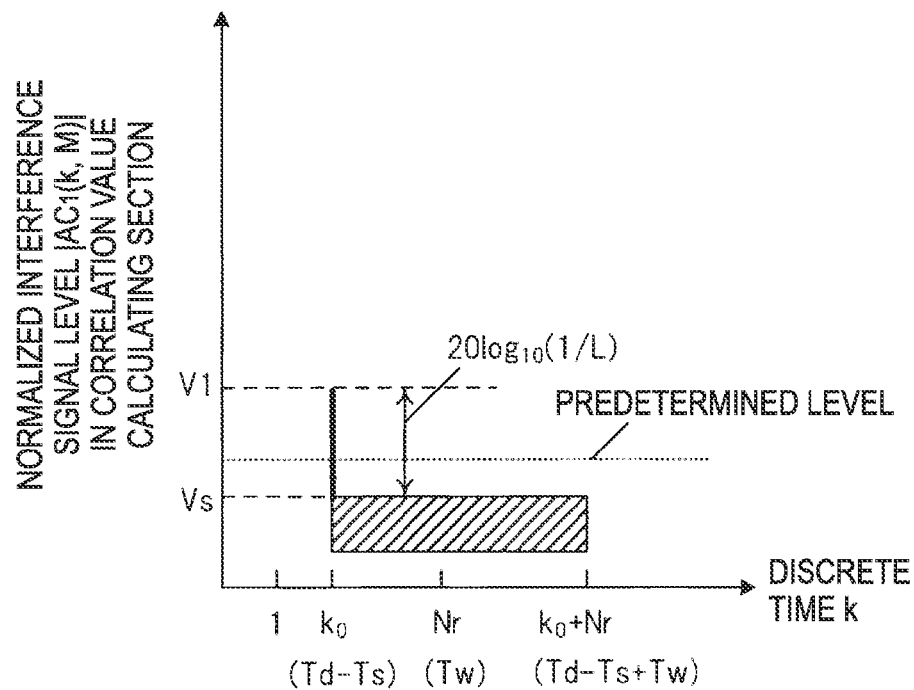
FIG. 10 shows the normalized interference signal level which is output from the correlation value calculating section.

FIG. 10 shows the normalized interference signal level which is output from the correlation value calculating section 31. The abscissa indicates the discrete time k, and the ordinate indicates the normalized interference signal level (|AC1(k, M)|) which is output from the correlation value calculating section 31.

In the case where the first and second radar units 11, 11a transmit radar transmission signals (pulse compression codes) having the same excellent autocorrelation characteristics, moreover, the wide-angle radar device 10 can suppress the interference signal in the interference region ([k=k0 to (k0+Nr)]) by means of the pulse compression process.

Even when the normalized interference signal level is similar to the above-described predetermined value level as shown in FIG. 9(b), therefore, the wide-angle radar device 10 can suppress an interference signal in the interference region ([k=(k0+1) to (k0+Nr)]) to the predetermined value level or lower by means of the pulse compression process of the correlation value calculating section 31. As shown in FIG. 10, the normalized interference signal level at the discrete time k=k0 has a value which is equal to or higher than the predetermined level.

In the case where the interference signal from the other radar unit further contains a plurality of delay waves, when all the arrival time periods of the plurality of delay waves are equal to or less than the discrete time k=Nr, the wide-angle radar device 10 can suppress the interference signal after the transmission zone Tw by means of the pulse compression process of the correlation value calculating section 31. For example, this is effective in the case where the measurement ranges (range of the discrete time k) of the radar units are started from the ending timing of the transmission zone Tw, i.e., where the discrete time k is set to k=Nr to (Nr+Nu).

In the case where the M sequence code or the Barker code is used as the radar transmission signal, particularly, the wide-angle radar device 10 can perform suppression of 20 log 10(1/L) [dB] in the interference region ([k=(k0+1) to (k0+Nr)]) excluding the discrete time k=k0 as shown in FIG. 10. In FIG. 10, the thick line at the discrete time k=k0 shows the normalized interference signal level at the discrete time k=k0, and indicates that the normalized interference signal level exceeds the above-described predetermined value level.

In the case where the complementary code is used as the radar transmission signal, in the wide-angle radar device 10, ideally, the interference amount can be made substantially zero in the interference region ([k=k0 to (k0+Nr)]). In the case where the complementary code is used, however, one paired code sequences of the complementary code must be transmitted in a certain transmission period Tr, and the other paired code sequences of the complementary code must be transmitted in the next transmission period Tr.

Figure 11:
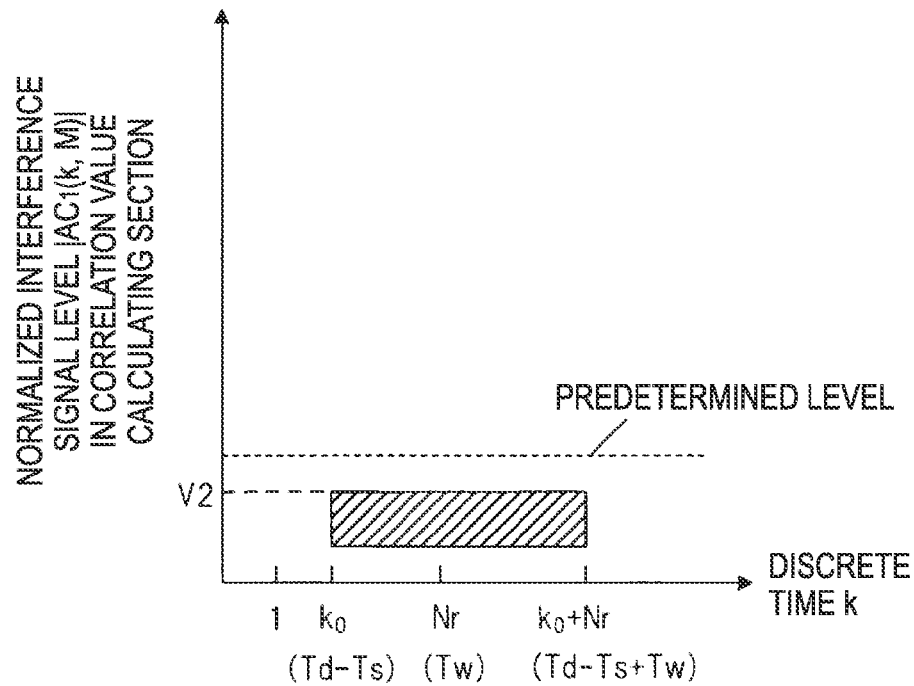
FIG. 11 shows the normalized interference signal level which is output from the correlation value calculating section.

FIG. 11 shows the normalized interference signal level which is output from the correlation value calculating section 31. The abscissa indicates the discrete time k, and the ordinate indicates the normalized interference signal level (|AC1(k, M)|) which is output from the correlation value calculating section 31.

In the case where the first and second radar units 11, 11a transmit different radar transmission signals, when a code in which the maximum value of the absolute value of the mutual correlation value between radar transmission signals indicated by Exp. (18) is small is used, moreover, the wide-angle radar device 10 can suppress the interference signal from the other radar unit.

[Exp. 18]

$$R_{ab}(\tau) = \sum_{n=1}^{L} a_n b_{n+\tau}^*  \quad (18)$$

In Exp. (18), the code an is the first radar transmission signal transmitted from the first radar unit 11, the code bn is the second radar transmission signal transmitted from the second radar unit 11a, and both the code lengths of the codes an and bn are L.

Even when the normalized interference signal level is similar to the above-described predetermined value level as shown in FIG. 9(b), therefore, the wide-angle radar device 10 can suppress an interference signal in the interference region ([k=k0 to (k0+Nr)]) to the predetermined value level or lower by means of the pulse compression process of the correlation value calculating section 31 (see FIG. 11).

In the case where the interference signal from the other radar unit further contains a plurality of delay waves, when all the arrival time periods of the plurality of delay waves are equal to or less than the discrete time k=Nr, the wide-angle radar device 10 can suppress the interference signal after the transmission zone Tw by means of the pulse compression process of the correlation value calculating section 31. For example, this is effective in the case where the measurement ranges (range of the discrete time k) of the radar units are started from the ending timing of the transmission zone Tw, i.e., where the discrete time k is set to k=Nr to (Nr+Nu).

Although, in the wide-angle radar device 10 of the above-described first embodiment, the configuration and operation in the case where the radar units use a pulse compression radar of the code length of L have been described, the radar units may employ a pulse radar in which a single pulse is used.

In this case, for example, the code producing section 18 of the first radar transmitting section 15 produces a single pulse of the code length of L=1. Similarly, the code producing section 18a of the second radar transmitting section 15a produces a single pulse of the code length of L=1. Moreover, the time shift of the adjustment time period Ts is performed between the starting time of the transmission period Tr of the first radar unit 11 and that of the transmission period Tr of the second radar unit 11a.

Similarly with the wide-angle radar device 10 of the above-described first embodiment, even in the case where the radar units use a pulse radar, therefore, the above-described normalized interference signal level can be suppressed to a predetermined value or less.

The wide-angle radar device 10 of the above-described first embodiment has been described under the assumption that the transmission periods Tr of the first and second radar units 11, 11a are fixedly preset. However, the transmission periods Tr may be adaptively set as indicated in Exp. (19) based on the arrival time period Td of the interference signal from the other radar unit.

[Exp. 19]

$$Tr=2Ts=2(Td+\Delta T) \quad (19)$$

In the wide-angle radar device 10, when the transmission periods Tr are adaptively set in accordance with Exp. (19), the amounts of mutual interference between the radar units can be made equal to each other. In this case, interference signal levels in the whole wide-angle radar device 10 can be uniformalized, and the position estimation performance of the wide-angle radar device 10 can be averagely improved.

In the case where the interference signal level is different depending on the radar unit, an influence of a radar unit in which the SINR is low is produced, and the rates of erroneous detection and undetection of the target TA in the wide-angle radar device 10 are increased.

In the case where Exp. (16) above holds, however, the increase of the rates of erroneous detection and undetection of the target TA in the wide-angle radar device 10 can be reduced. Here, the parameter ΔT is a time margin including the accuracy of synchronization between the first and second radar units 11, 11a, and the detection error of the arrival time Td of the interference signal.

[Modification 1 of First Embodiment]

In the wide-angle radar device 10 of the first embodiment, the radar units transmit the radar transmission signal having the same fixed code length of L for each transmission period Tr. Since the code lengths L of the radar transmission signals are fixed, the maximum measuring distances of the radar units are equal to each other.

In a wide-angle radar device 40 of Modification 1 of the first embodiment, each radar unit transmits a radar transmission signal for short-range measurement having a code length of L1, and that for long-range measurement having a code length of L2, with different transmission periods respectively corresponding to the code lengths. Furthermore, the radar units transmit the radar transmission signal for short-range measurement having a code length of L1, and that for long-range measurement having a code length of L2 so that the timings of transmitting the radar transmission signal for short-range measurement having a code length of L1 from the radar units are not overlap each other.

In the following description, the transmission period of the radar transmission signal for short-range measurement having a code length of L1 is a parameter Tr1, and that of the radar transmission signal for long-range measurement having a code length of L2 is a parameter Tr2 (Tr1<Tr2).

Figure 12:
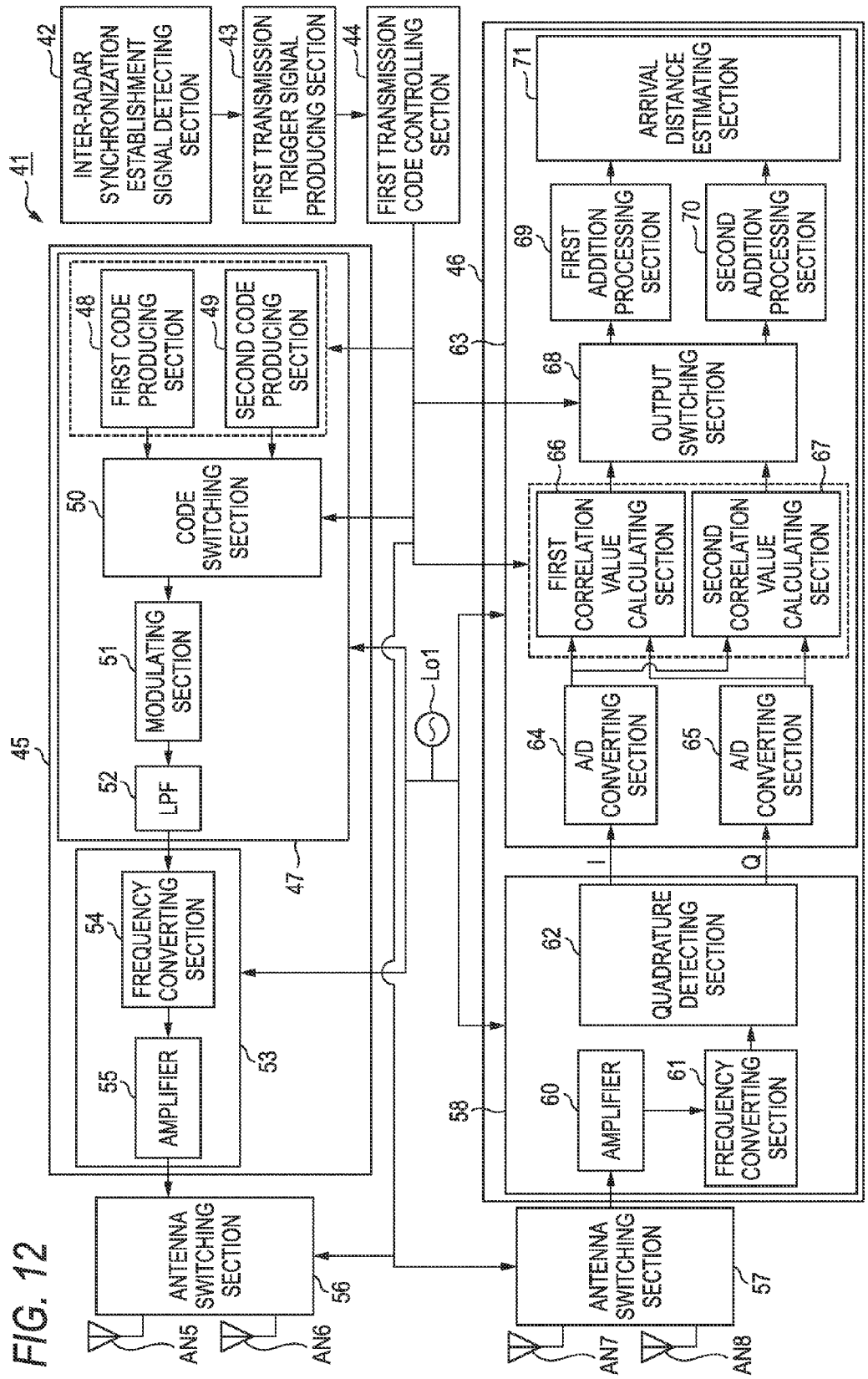
FIG. 12 is a block diagram showing in detail the internal configurations of radar units in a wide-angle radar device of Modification 1 of the first embodiment.
Figure 13:
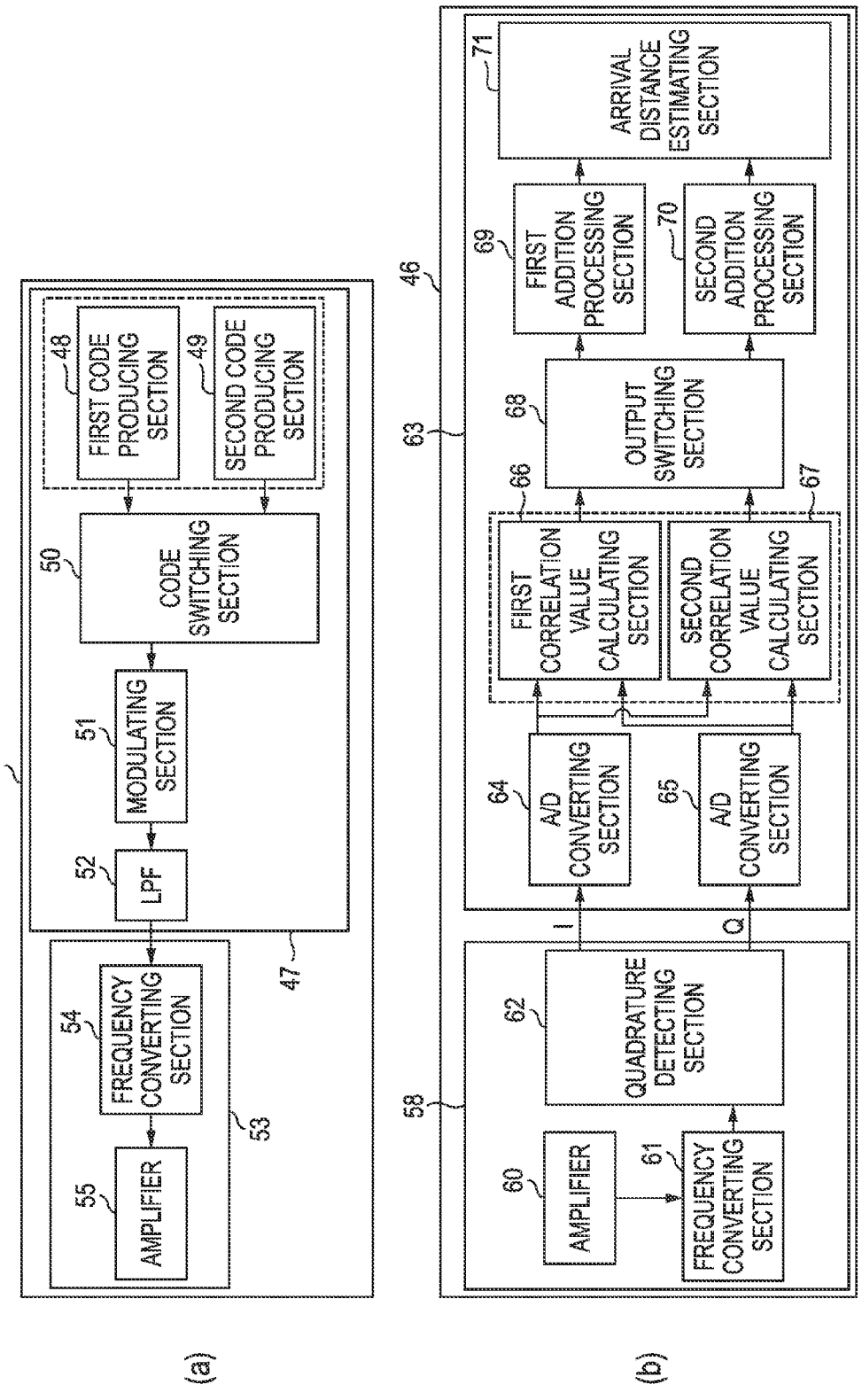
FIG. 13 shows block diagrams showing a partial configuration of a first radar unit in the wide-angle radar device of Modification 1 of the first embodiment, (a) shows a first radar transmitting section, and (b) shows a first radar receiving section.

Hereinafter, the configuration and operation of the wide-angle radar device 40 of Modification 1 of the first embodiment will be described with reference to FIGS. 12 to 15. FIG. 12 is a block diagram showing in detail the internal configurations of radar units in the wide-angle radar device 40 of Modification 1 of the first embodiment. FIG. 13 shows block diagrams showing a partial configuration of a first radar unit 41 in the wide-angle radar device 40 of Modification 1 of the first embodiment. In the figure, (a) shows a first radar transmitting section 45, and (b) shows a first radar receiving section 46. The views of FIG. 13 independently operate as a transmitting apparatus and a receiving apparatus, respectively.

Figure 14:
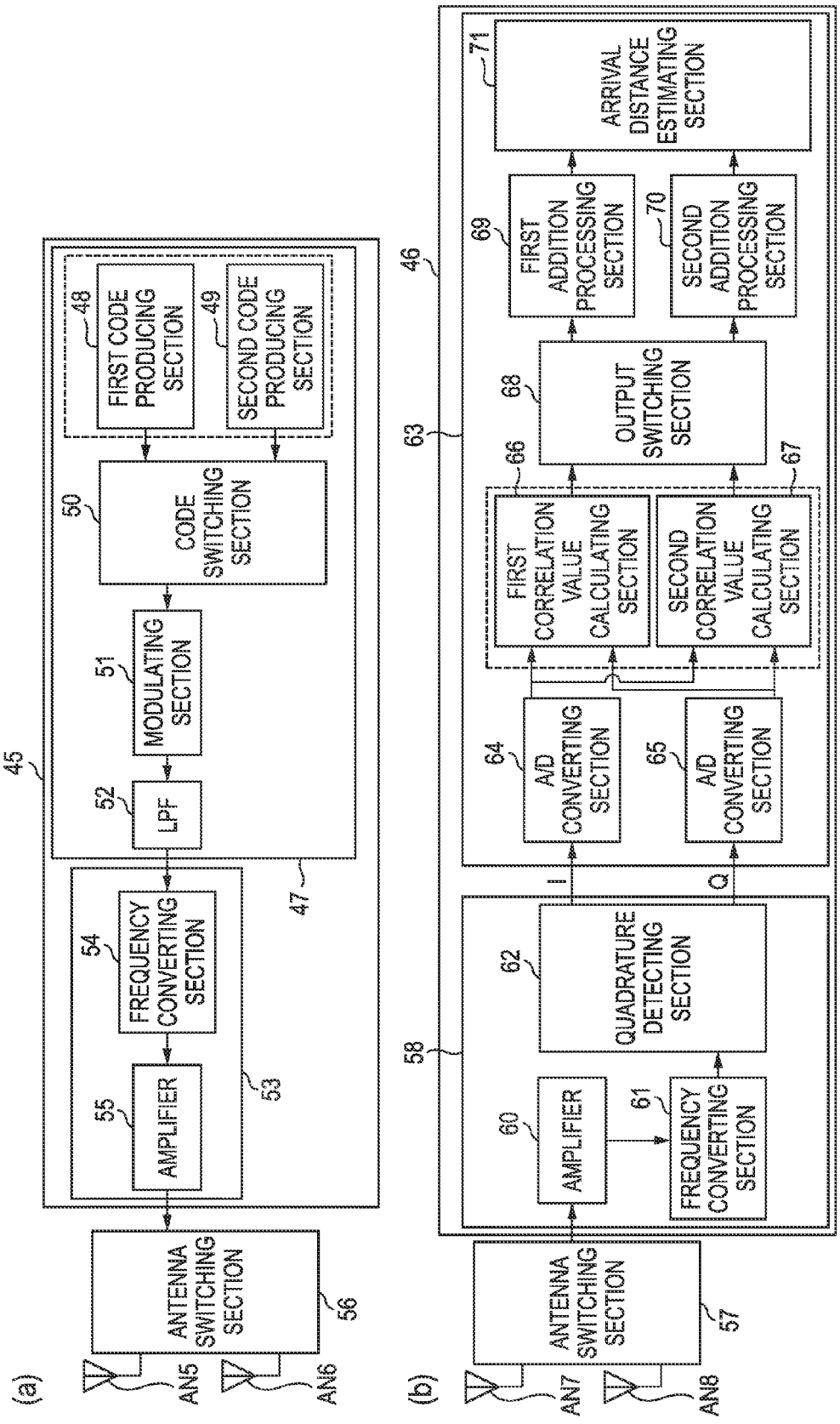
FIG. 14 shows block diagrams showing a further partial configuration of the first radar unit in the wide-angle radar device of Modification 1 of the first embodiment, (a) shows the first radar transmitting section including transmission antennas and an antenna switching section, and (b) shows the first radar receiving section including reception antennas and an antenna switching section.
Figure 15:
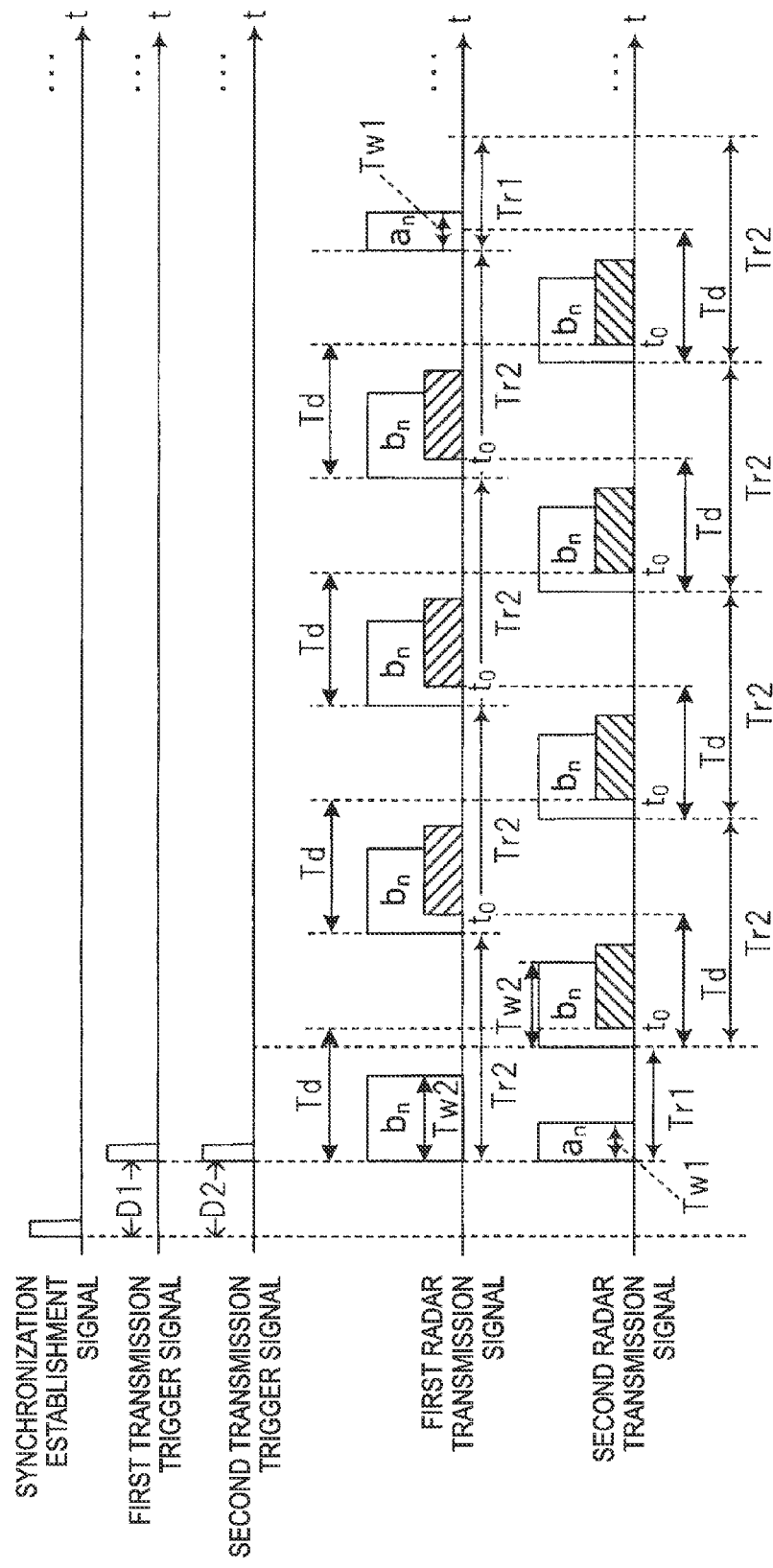
FIG. 15 is a timing chart related to the operations of the radar units in the wide-angle radar device of Modification 1 of the first embodiment.

FIG. 14 shows block diagrams showing a further partial configuration of the first radar unit 41 in the wide-angle radar device 40 of Modification 1 of the first embodiment. In the figure, (a) shows the first radar transmitting section 45 including transmission antennas AN5, AN6 and an antenna switching section 56, and (b) shows the first radar receiving section 46 including reception antennas AN7, AN8 and an antenna switching section 57. The views of FIG. 14 independently operate as a transmitting apparatus and a receiving apparatus, respectively. FIG. 15 is a timing chart related to the operations of the radar units in the wide-angle radar device 40 of Modification 1 of the first embodiment.

The wide-angle radar device 40 of Modification 1 of the first embodiment has a plurality of, for example, two radar units (the first radar unit 41, a second radar unit 41a). In the wide-angle radar device 40, the first radar unit 41 and the second radar unit 41a produce predetermined intermittent high-frequency radar transmission signals, respectively, and transmit the signals from the transmission antennas AN5, AN6 and transmission antenna AN7, AN8.

Furthermore, the first radar unit 41 receives a signal of a reflected wave which is obtained by reflecting the radar transmission signal transmitted from the first radar unit 41, from a target TA, and the radar transmission signal which is transmitted from the second radar unit 41a, and which functions as an interference wave, through the reception antenna AN7 or the reception antenna AN8.

Furthermore, the second radar unit 41a receives a signal of a reflected wave which is obtained by reflecting the radar transmission signal transmitted from the second radar unit 41a, from the target TA, and the radar transmission signal which is transmitted from the first radar unit 41, and which functions as an interference wave, through a reception antenna AN11 or a reception antenna AN12.

In the wide-angle radar device 40, moreover, the first radar unit 41 and the second radar unit 41a perform signal processing on the reception signals which are received through the first radar receiving section 46 and a second radar receiving section 46a, respectively, and detect the presence or absence of the target TA.

As shown in FIG. 12, the first radar unit 41 includes: an inter-radar synchronization establishment signal detecting section 42; a first transmission trigger signal producing section 43; a first transmission code controlling section 44, the first radar transmitting section 45 which is connected to the transmission antennas AN5, AN6 through the antenna switching section 56; and the first radar receiving section 46 which is connected to the reception antennas AN7, AN8 through the antenna switching section 57. Both the first radar transmitting section 45 and the first radar receiving section 46 are connected to a reference signal oscillator Lo1, and a signal from the reference signal oscillator Lo1 is supplied so as to establish synchronization of the operations of the first radar transmitting section 45 and the first radar receiving section 46.

Similarly, the second radar unit 41a includes: an inter-radar synchronization establishment signal detecting section 42a; a second transmission trigger signal producing section 43a; a second transmission code controlling section 44a, a second radar transmitting section 45a which is connected to the transmission antennas AN9, AN10 through an antenna switching section 56a; and the second radar receiving section 46a which is connected to the reception antennas AN11, AN12 through an antenna switching section 57a.

Both the second radar transmitting section 45a and the second radar receiving section 46a are connected to a reference signal oscillator Lo2, and a signal from the reference signal oscillator Lo2 is supplied so as to establish synchronization of the operations of the second radar transmitting section 45a and the second radar receiving section 46a.

The first radar unit 41 and the second radar unit 41a have a similar configuration, and operate in a similar manner. In the following description of the configuration and operation of the wide-angle radar device 40, therefore, the configuration and operation of the first radar unit 41 will be mainly described, and those of the second radar unit 41a will be described as required.

The operations of the inter-radar synchronization establishment signal detecting section 42 and the first transmission trigger signal producing section 43 are similar to those of the inter-radar synchronization establishment signal detecting section 12 and first transmission trigger signal producing section 43 of the above-described first embodiment, and hence the description of the operations is omitted.

Also the operations of the inter-radar synchronization establishment signal detecting section 42*a* and the second transmission trigger signal producing section 43*a* are similar to those of the inter-radar synchronization establishment signal detecting section 12*a* and first transmission trigger signal producing section 43*a* of the above-described first embodiment, and hence the description of the operations is omitted.

The first transmission code controlling section 44 controls the first radar transmitting section 45 so as to produce the first radar transmission signal for short-range measurement and that for long-range measurement, in accordance with the production of the first transmission trigger signal by the first transmission trigger signal producing section 43.

Specifically, in accordance with the first transmission trigger signal, the first transmission code controlling section 44 outputs a transmission code control signal indicating that a first transmission signal for short-range measurement is produced with a transmission period Tr1, to each of a first code producing section 48 and code switching section 50 of a first transmission signal producing section 47.

In accordance with the first transmission trigger signal, the first transmission code controlling section 44 further outputs a transmission code control signal indicating that a first transmission signal for long-range measurement is produced with a transmission period Tr2, to each of a second code producing section 49 and code switching section 50 of the first transmission signal producing section 47.

The first transmission code controlling section 44 further outputs the transmission code control signal indicating that the first transmission signal for short-range measurement is produced, also to a first correlation value calculating section 66 of the first radar receiving section 46 which will be described later.

The first transmission code controlling section 44 further outputs the transmission code control signal indicating that the first transmission signal for long-range measurement is produced, also to a second correlation value calculating section 67 of the first radar receiving section 46 which will be described later.

The second transmission code controlling section 44*a* controls the second radar transmitting section 45*a* so as to produce the second radar transmission signal for short-range measurement and that for long-range measurement, in accordance with the production of the second transmission trigger signal by the second transmission trigger signal producing section 43*a*.

Specifically, in accordance with the second transmission trigger signal, the second transmission code controlling section 44*a* outputs a transmission code control signal indicating that a second transmission signal for short-range measurement is produced with the transmission period Tr1, to each of a third code producing section 48*a* and code switching section 50*a* of a second transmission signal producing section 47*a*.

In accordance with the second transmission trigger signal, the second transmission code controlling section 44*a* further outputs a transmission code control signal indicating that a second transmission signal for long-range measurement is produced with the transmission period Tr2, to each of a fourth code producing section 49*a* and code switching section 50*a* of the second transmission signal producing section 47*a*.

The second transmission code controlling section 44*a* further outputs the transmission code control signal indicating that the second transmission signal for short-range measurement is produced, also to a third correlation value calculating section 66*a* of the second radar receiving section 46*a* which will be described later.

The second transmission code controlling section 44*a* further outputs the transmission code control signal indicating that the second transmission signal for long-range measurement is produced, also to a fourth correlation value calculating section 67*a* of the second radar receiving section 46*a* which will be described later.

Next, the configuration of the first radar transmitting section 45 will be described.

As shown in FIG. 12, the first radar transmitting section 45 includes the first transmission signal producing section 47, and a transmission RF section 53 to which the transmission antennas AN5, AN6 are connected through the antenna switching section 56.

As shown in FIG. 12, the first transmission signal producing section 47 includes the first code producing section 48, the second code producing section 49, the code switching section 50, a modulating section 51, and an LPF 52. In FIG. 12, the first transmission signal producing section 47 is configured so as to include the LPF 52. Alternatively, the LPF 52 may be configured in the first radar transmitting section 45 independently from the first transmission signal producing section 47.

As shown in FIG. 12, the transmission RF section 53 includes a frequency converting section 54 and an amplifier 55.

Next, the configuration of the second radar transmitting section 45*a* will be described. The second radar transmitting section 45*a* is configured similarly with the first radar transmitting section 45 shown in FIG. 12, and therefore illustration of the second radar transmitting section 45*a* is omitted.

The second radar transmitting section 45*a* includes the second transmission signal producing section 47*a*, and a transmission RF section 53*a* to which the transmission antennas AN9, AN10 are connected through the antenna switching section 56*a*.

Similarly, the second transmission signal producing section 47*a* includes a second code producing section 48*a*, a second code producing section 49*a*, the code switching section 50*a*, a modulating section 51*a*, and an LPF 52*a*. The second transmission signal producing section 47*a* is configured so as to include the LPF 52*a*. Alternatively, the LPF 52*a* may be configured in the second radar transmitting section 45*a* independently from the second transmission signal producing section 47*a*.

The transmission RF section 53*a* includes a frequency converting section 54*a* and an amplifier 55*a*.

Next, the configurations and operations of the sections of the first radar transmitting section 45 will be described.

Based on a reference signal produced by the reference signal oscillator Lo1, the first transmission signal producing section 47 produces a signal which is obtained by multiplying the reference signal a predetermined number of times. The sections of the first transmission signal producing section 47 operate based on the signal which is obtained by multiplying the reference signal the predetermined number of times.

The first transmission signal producing section 47 modulates the code sequence an having the code length of L1 or the code sequence bn having the code length of L2 to periodically produce a base-band first transmission signal $r(k, M)$ (pulse compression code) indicated by Exp. (5).

It is assumed that the first transmission signal produced by the first transmission signal producing section 47 is not a continuous signal. As shown in the fourth and fifth stages of FIG. 15, in the transmission zone Tw2 [sec.] of each transmission period Tr2 and the transmission zone Tw1 of each transmission period Tr1, for example, an No [number] of samples exist per pulse code with respect to the code sequence bn having the code length of L2 and the code sequence an having a code length of L1, respectively.

Therefore, an Nr1 (=No×L1) number of samples, and an Nr2 (=No×L2) number of samples are contained in the transmission zones of the transmission periods Tr1, Tr2. It is assumed that, in the non-transmission zones (Tr−Tw1) [sec.], (Tr−Tw2) [sec.] in th transmission periods Tr1, Tr2, an Nu1 [number] of samples and an Nu2 [number] of samples exist as the base-band first transmission signal.

The first code producing section 48 produces a transmission code for pulse compression and of the code sequence an having the code length of L1 based on the transmission code control signal output from the first transmission code controlling section 44. Preferably, the transmission code is the Barker code sequence, the M sequence code, or the like.

The first code producing section 48 outputs the produced transmission code of the code sequence an to the code switching section 50.

The second code producing section 49 produces a transmission code for pulse compression and of the code sequence bn having the code length of L2 based on the transmission code control signal output from the first transmission code controlling section 44. Preferably, the transmission code is the Barker code sequence, the M sequence code, or the like.

The second code producing section 49 outputs the produced transmission code of the code sequence bn to the code switching section 50.

The code switching section 50 receives the transmission code control signal output from the first transmission code controlling section 44, and, based on the received transmission code control signal, selectively switches and outputs the code sequence an or the code sequence bn to the modulating section 51.

The operations of the modulating section 51 and the LPF 52 are similar to those of the modulating section 19 and LPF 20 of the above-described first embodiment, and hence the description of the operations is omitted.

Based on a reference signal produced by the reference signal oscillator Lo1, the transmission RF section 53 produces a signal which is obtained by multiplying the reference signal a predetermined number of times. The transmission RF section 53 operates based on the produced signal.

Specifically, the frequency converting section 54 receives the first transmission signal r(k, M) produced by the first transmission signal producing section 47, and upconverts the input base-band first transmission signal r(k, M) to produce a high-frequency first radar transmission signal in the carrier frequency band. The frequency converting section 54 outputs the produced first radar transmission signal to the amplifier 55.

The amplifier 55 receives the output first radar transmission signal, amplifies the level of the input first radar transmission signal to a predetermined level, and supplies the amplified signal to the antenna switching section 56. The amplified first radar transmission signal is transmitted so as to be radiated into the space from the transmission antenna AN5 or the transmission antenna AN6 through the antenna switching section 56.

The antenna switching section 56 receives the transmission code control signal output from the first transmission code controlling section 44. Based on the received transmission code control signal, furthermore, the antenna switching section 56 selectively switches the transmission antenna corresponding to the first radar transmission signal to be transmitted, from the transmission antenna AN5 or the transmission antenna AN6. In the wide-angle radar device 40 of Modification 1 of the first embodiment, the transmission antenna AN5 is used for short-range measurement, and the transmission antenna AN6 is used for long-range measurement.

In the case where the code switching section 50 selectively outputs the code sequence an in the transmission period Tr1, namely, the antenna switching section 56 switches to the transmission antenna AN5 for short-range measurement based on the transmission code control signal output from the first transmission code controlling section 44.

In the case where the code switching section 50 selectively outputs the code sequence bn in the transmission period Tr2, moreover, the antenna switching section 56 switches to the transmission antenna AN6 for long-range measurement based on the transmission code control signal output from the first transmission code controlling section 44.

The transmission antenna AN5 or the transmission antenna AN6 transmits the first radar transmission signal which is output from the transmission RF section 53, so as to radiate the signal into the space. As shown in the fourth stage of FIG. 15, the first radar transmission signal is transmitted during the transmission zone Tw2 in the transmission period Tr2, but not transmitted during the non-transmission zone (Tr2−Tw2).

Similarly, as shown in the fifth stage of FIG. 15, the second radar transmission signal is transmitted during the transmission zone Tw2 in the transmission period Tr2, but not transmitted during the non-transmission zone (Tr2−Tw2). Moreover, the first radar transmission signal is transmitted during the transmission zone Tw1 in the transmission period Tr1, but not transmitted during the non-transmission zone (Tr1−Tw1).

The signals which are obtained by multiplying a predetermined number of times the reference signals produced by the reference signal oscillators Lo1, Lo2 are commonly supplied to local oscillators which are disposed in the transmission RF sections 53, 53a and reception RF sections 58, 58a of the above-described radar units, respectively. Therefore, synchronization between the local oscillators of the transmission RF sections 53, 53a and reception RF sections 58, 58a of the radar units can be established.

Here, transmission timings of the synchronization establishment signal, first transmission trigger signal, second transmission trigger signal, first radar transmission signal, and second radar transmission signal which are described above will be described with reference to FIG. 15. As described above, the first transmission trigger signal producing section 43 produces the first transmission trigger signal after elapse of the delay time period D1 specific to the first radar unit 41 from the detection or reception of the synchronization establishment signal by the inter-radar synchronization establishment signal detecting section 42.

Similarly, the second transmission trigger signal producing section 43a produces the second transmission trigger signal after elapse of the delay time period D2 specific to the second radar unit 41a from the detection or reception of the synchronization establishment signal by the inter-radar synchronization establishment signal detecting section 42a.

The first transmission code controlling section 44 controls the first radar transmitting section 45 so that the first radar transmission signal is produced at the same timing as the production of the first transmission trigger signal, thereafter the transmission code bn for long-range measurement is transmitted a predetermined number (in FIG. 15, four) of times, and the transmission code an for short-range measurement is then transmitted.

Similarly, the second transmission code controlling section 44a controls the second radar transmitting section 45a so that the second radar transmission signal is produced at the same timing as the production of the second transmission trigger signal, thereafter the transmission code an for short-range measurement is transmitted, and the transmission code bn for long-range measurement is then transmitted.

Namely, the radar units transmit the radar transmission signal for short-range measurement having a code length of L1, and that for long-range measurement having a code length of L2 so that the timings of transmitting the radar transmission signal for short-range measurement having a code length of L1 from the radar units are not overlap each other.

Therefore, the transmission period Tr1 is set so that the starting time t0 of the arrival time period Td of the radar transmission signal for long-range measurement of the first radar unit 41 is within the transmission zone Tw2 of the radar transmission signal for long-range measurement of the second radar unit 41a.

Moreover, the transmission period Tr2 is set so that the starting time t0 of the arrival time period Td of the interference signal of the radar transmission signal for long-range measurement of the second radar unit 41a is within the transmission zone Tw2 of the radar transmission signal for long-range measurement of the first radar unit 41.

Namely, the transmission period Tr2 is set so as to satisfy Exp. (20).

[Exp. 20]

$$Td-Tw2<Tr2<Td \quad (20)$$

FIG. 15 shows the case where the transmission period Tr1 of the radar transmission signal for short-range measurement is a half of the transmission period Tr2 of the radar transmission signal for long-range measurement.

However, the transmission period Tr1 of the radar transmission signal for short-range measurement may not be a time period which is a half of the transmission period Tr2 of the radar transmission signal for long-range measurement (Tr1≠Tr2/2).

In this case, the time period from the start of transmission of the radar transmission signal for long-range measurement by the first radar unit 41 to that of transmission of the radar transmission signal for long-range measurement by the second radar unit 41a is indicated by Ts21.

Moreover, the time period from the start of transmission of the radar transmission signal for long-range measurement by the second radar unit 41a to that of transmission of the radar transmission signal for long-range measurement by the first radar unit 41 is indicated by Ts12. Exp. (21) holds between the parameters Ts21 and Ts12. In this case, the parameters Ts21 and Ts12 are set so that Exp. (10) holds.

[Exp. 21]

$$TS_{21}+Ts_{12}=Tr1 \quad (21)$$

Next, the configuration of the first radar receiving section 46 will be described. The second radar receiving section 46a is configured similarly with the first radar receiving section 46 shown in FIG. 12, and therefore illustration of the second radar receiving section 46a is omitted.

As shown in FIG. 12, the first radar receiving section 46 includes the reception RF section 58 to which the reception antenna AN7 and the reception antenna AN8 are connected through the antenna switching section 57, and a signal processing section 63.

The reception RF section 58 includes an amplifier 60, a frequency converting section 61, and a quadrature detecting section 62. The signal processing section 63 includes A/D converting sections 64, 65, the first correlation value calculating section 66, the second correlation value calculating section 67, an output switching section 68, a first addition processing section 69, a second addition processing section 70, and an arrival distance estimating section 71.

The first radar receiving section 46 periodically calculates the transmission period Tr1 or the transmission period Tr2 as signal processing zones in the signal processing section 63, in accordance with the radar transmission signal which is transmitted from the transmission antenna AN5 or the transmission antenna AN6 by the transmission code control signal output from the first transmission code controlling section 44.

Next, the configuration of the second radar receiving section 46a will be described. The second radar receiving section 46a is configured similarly with the first radar receiving section 46 shown in FIG. 12, and therefore illustration of the second radar receiving section 46a is omitted.

The second radar receiving section 46a includes the reception RF section 58a to which the reception antenna AN11 and the reception antenna AN12 are connected through the antenna switching section 57a, and a signal processing section 63a.

The reception RF section 58a includes an amplifier 60a, a frequency converting section 61a, and a quadrature detecting section 62a. The signal processing section 63a includes A/D converting sections 64a, 65a, the first correlation value calculating section 66a, the second correlation value calculating section 67a, an output switching section 68a, a first addition processing section 69a, a second addition processing section 70a, and an arrival distance estimating section 71a.

The second radar receiving section 46a periodically calculates the transmission period Tr1 or the transmission period Tr2 as signal processing zones in the signal processing section 63a, in accordance with the radar transmission signal which is transmitted from the transmission antenna AN9 or the transmission antenna AN10 by the transmission code control signal output from the second transmission code controlling section 44a.

Next, the configurations and operations of the sections of the first radar receiving section 46 will be described.

The antenna switching section 57 receives the transmission code control signal output from the first transmission code controlling section 44. Based on the received transmission code control signal, furthermore, the antenna switching section 57 selectively switches the reception antenna which receives the signal of the reflective wave with respect to the first radar transmission signal, and the interference signal from the second radar unit 41a, from the reception antenna AN7 or the reception antenna AN8.

In the wide-angle radar device 40 of Modification 1 of the first embodiment, the reception antenna AN7 is used for short-range measurement, and the reception antenna AN8 is used for long-range measurement.

In the case where the antenna switching section 56 switches to the transmission antenna AN5, therefore, the antenna switching section 57 switches to the reception antenna AN7. Similarly, in the case where the antenna switching section 56 switches to the transmission antenna AN6, the antenna switching section 57 switches to the reception antenna AN8.

The reception antenna AN7 or the reception antenna AN8 receives a signal of a reflected wave which is obtained by reflecting the first radar transmission signal transmitted from the transmission antenna AN5 or the transmission antenna AN6, from a target TA, and the interference signal from the second radar unit 41*a*. The reception signal received by the reception antenna AN7 or the reception antenna AN8 is input to the reception RF section 58 through the antenna switching section 57.

The operations of the sections of the reception RF section 58 are similar to those of the reception RF section 24 of the first embodiment, and hence the description of the operations is omitted.

The A/D converting section 64 performs sampling at the discrete time k on the base-band in-phase signal supplied from the quadrature detecting section 62, and converts the in-phase signal which constitutes analog data, to digital data. The A/D converting section 64 outputs the in-phase signal which is converted to digital data, to the first correlation value calculating section 66 and the second correlation value calculating section 67.

Similarly, the A/D converting section 65 performs sampling at the discrete time k on the base-band quadrate signal supplied from the quadrature detecting section 62, and converts the quadrate signal which constitutes analog data, to digital data. The A/D converting section 65 outputs the quadrate signal which is converted to digital data, to the first correlation value calculating section 66 and the second correlation value calculating section 67.

The first correlation value calculating section 66 receives the complex signal x(k, M) of the digital data output from the A/D converting section 64 and the A/D converting section 65. The first correlation value calculating section 66 establishes synchronization with the operation of the first transmission signal producing section 47, so that, similarly with the first transmission signal producing section 47, a signal which is obtained by multiplying the reference signal produced by the reference signal oscillator Lo1, a predetermined number of times is produced based on the reference signal. In FIG. 12, the input of the reference signal to the first correlation value calculating section 66 is omitted.

Based on the signal which is obtained by multiplying the reference signal a predetermined number of times, the first correlation value calculating section 66 periodically produces the reference first transmission signal r(k, M) of the same base band as the first transmission signal for short-range measurement (see Exp. (5)) produced by the first transmission signal producing section 47 in accordance with the discrete time k.

Moreover, the first correlation value calculating section 66 calculates a first correlation value AC1 between the input complex signal x(k, M) and the produced reference first transmission signal r(k, M). In the calculation of the first correlation value AC1, the complex conjugate value of the reference first transmission signal r(k, M) is used.

Specifically, in the case of the transmission period Tr1 shown in FIG. 15 or namely the discrete time of k=1 to (Nr1+Nu1), the first correlation value calculating section 66 calculates the first correlation value AC1 in accordance with Exp. (14). The first correlation value calculating section 66 outputs the first correlation value AC1 which is calculated in accordance with Exp. (14), to the output switching section 68.

The second correlation value calculating section 67 receives the complex signal x(k, M) of the digital data output from the A/D converting section 64 and the A/D converting section 65. The second correlation value calculating section 67 establishes synchronization with the operation of the first transmission signal producing section 47, so that, similarly with the first transmission signal producing section 47, a signal which is obtained by multiplying the reference signal produced by the reference signal oscillator Lo1, a predetermined number of times is produced based on the reference signal. In FIG. 12, the input of the reference signal to the first correlation value calculating section 66 is omitted.

Based on the signal which is obtained by multiplying the reference signal a predetermined number of times, the second correlation value calculating section 67 periodically produces the reference first transmission signal r(k, M) of the same base band as the first transmission signal for long-range measurement (see Exp. (5)) produced by the first transmission signal producing section 47 in accordance with the discrete time k.

Moreover, the second correlation value calculating section 67 calculates a second correlation value AC2 between the input complex signal x(k, M) and the produced reference first transmission signal r(k, M). In the calculation of the second correlation value AC2, the complex conjugate value of the reference first transmission signal r(k, M) is used.

Specifically, in the case of the transmission period Tr2 shown in FIG. 15 or namely the discrete time of k=1 to (Nr2+Nu2), the second correlation value calculating section 67 calculates the second correlation value AC2 in accordance with Exp. (14). The second correlation value calculating section 67 outputs the second correlation value AC2 which is calculated in accordance with Exp. (14), to the output switching section 68.

The output switching section 68 receives the transmission code control signal output from the first transmission code controlling section 44, and further receives the first correlation value AC1 and second correlation value AC2 which are output from the first correlation value calculating section 66 and the second correlation value calculating section 67, respectively. Based on the received transmission code control signal, the output switching section 68 selectively switches and outputs the first correlation value AC1 and the second correlation value AC2 to the first addition processing section 69 or the second addition processing section 70.

The first addition processing section 69 receives the first correlation value AC1 output from the output switching section 68. The first addition processing section 69 performs additional averaging a plurality of or R times by using the first correlation value AC1 which is multiplied in the M-th transmission period Tr1, as a unit.

Namely, the first addition processing section 69 calculates an average correlation value aveAC1 while matching the timings of the discrete time k by using correlation values from the first correlation value AC1(k, m) in the M-th transmission period Tr1 to the first correlation value AC1(k, m+R−1) in the (M+1)-th transmission period Tr1, as a unit. The first addition processing section 69 outputs the calculated average correlation value aveAC1 to the arrival distance estimating section 71.

As a result of the operation of the first addition processing section 69, the wide-angle radar device 40 further suppresses noise components, whereby the SNR (Signal Noise Ratio) can be improved, and the measurement performance related to estimation of the arrival distance of the target can be further improved.

The second addition processing section 70 receives the second correlation value AC2 output from the output switching section 68. The second addition processing section 70 performs additional averaging a plurality of or R times by using the second correlation value AC2 which is multiplied in the M-th transmission period Tr2, as a unit.

Namely, the second addition processing section 70 calculates an average correlation value aveAC2 while matching the timings of the discrete time k by using correlation values from the second correlation value AC2(k, m) in the M-th transmission period Tr2 to the second correlation value AC2(k, m+R−1) in the (M+1)-th transmission period Tr2, as a unit. The second addition processing section 70 outputs the calculated average correlation value aveAC2 to the arrival distance estimating section 71.

As a result of the operation of the second addition processing section 70, the wide-angle radar device 40 further suppresses noise components, whereby the SNR (Signal Noise Ratio) can be improved, and the measurement performance related to estimation of the arrival distance of the target can be further improved.

As described above, the calculations of the first correlation value calculating section 66 and the second correlation value calculating section 67 are performed on the discrete time k=1 to (Nr+Nu). Depending on the existing range of the target TA which is the measurement object of the wide-angle radar device 40, the measurement range (the range of k) may be further limited, for example, k=Nr to (Nr+Nu).

As a result, the wide-angle radar device 40 can reduce the calculation amount of the first correlation value calculating section 66 and the second correlation value calculating section 67. Namely, the wide-angle radar device 40 can reduce the power consumption due to the reduction of the calculation amount by the signal processing section 63.

The arrival distance estimating section 71 receives the average correlation value aveAC1 which is output from the first addition processing section 69, and the average correlation value aveAC2 which is output from the second addition processing section 70. The arrival distance estimating section 71 performs a calculation of estimating the distance from the first radar unit 41 to the target TA, based on the input average correlation value aveAC1 and average correlation value aveAC2. The calculation of estimating the distance to the target TA in the arrival distance estimating section 71 is a known technique, and can be realized by referring to, for example, Reference Non-patent Document 2 above.

Based on the average correlation value aveAC1 which is output from the first addition processing section 69, and the average correlation value aveAC2 which is output from the second addition processing section 70, for example, the arrival distance estimating section 71 determines the time differences between the discrete times when the average correlation value aveAC1 and the average correlation value aveAC2 have the maximum value, and the transmission time of the first radar transmission signal. Based on the determined time differences, moreover, the arrival distance estimating section 71 estimates the distance from the first radar unit 41 to the target TA.

Moreover, the arrival distance estimating section 71 may estimate the arrival angle of the target TA with respect to each radar unit based on the phase difference of reception signals received by the reception antennas.

In the wide-angle radar device 40 of Modification 1 of the first embodiment, therefore, the radar units transmit the radar transmission signal for short-range measurement having a code length of L1, and that for long-range measurement having a code length of L2 so that the timings of transmitting the radar transmission signal for short-range measurement having a code length of L1 are not overlap each other.

In the wide-angle radar device 40 of Modification 1 of the first embodiment, therefore, the transmission/reception process in which the directionality is restricted to a short range is performed in transmission and reception of the radar transmission signal for short-range measurement, and therefore the interference signal of the radar transmission signal for long-range measurement from the other radar unit which is not affected by the directionality can be further suppressed.

[Modification 2 of First Embodiment]

In the wide-angle radar devices 10, 40 of the above-described embodiments, the case where the number of the radar units is two has been described. In Modification 2 of the first embodiment, the case where the number of radar units constituting the wide-angle radar device is three or more, for example, three and four will be described.

Figure 16:
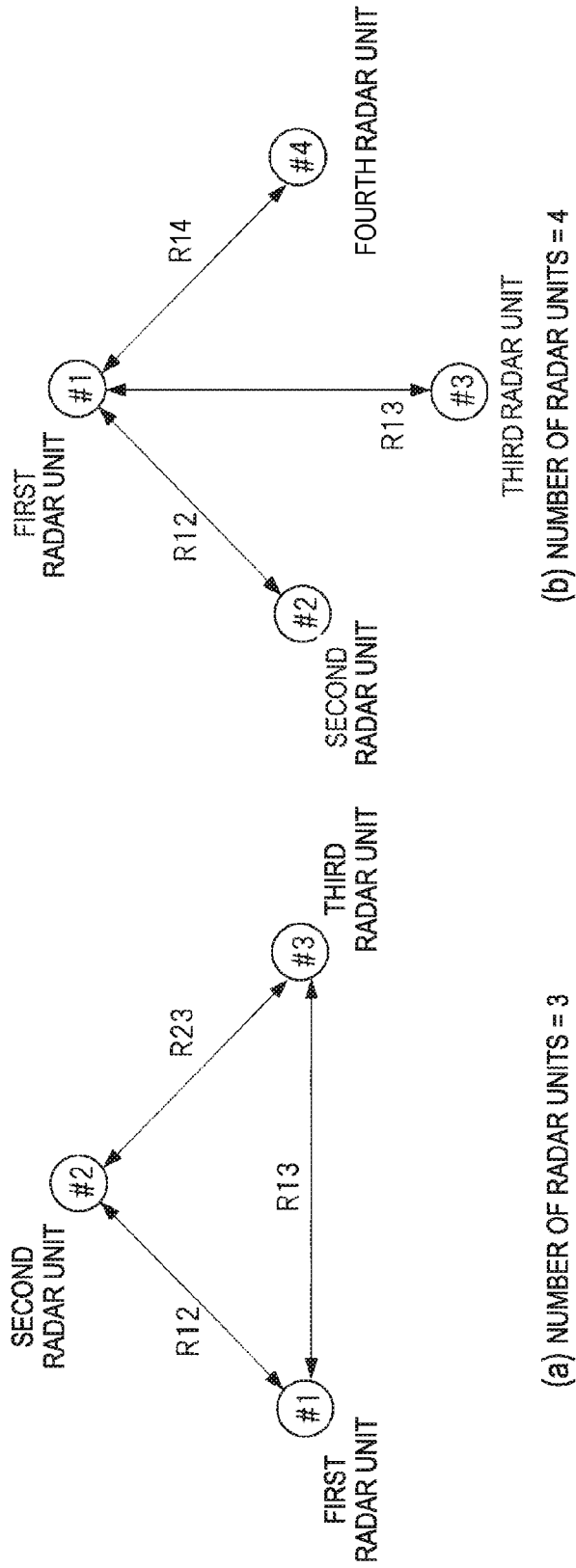
FIG. 16 shows diagrams showing an arrangement example of radar units in a wide-angle radar device having three or more radar units, (a) shows a case where the number of the radar units is three, and (b) shows a case where the number of the radar units is four.

FIG. 16 shows diagrams showing an arrangement example of radar units in a wide-angle radar device having three or more radar units. In the figure, (a) shows a case where the number of the radar units is three, and (b) shows a case where the number of the radar units is four.

In the case where the number of the radar units is three, a combination where the arrival time periods in which, to a certain radar units, interference signals from the other two radar units arrive are equal or relatively similar to each other is searched, and the radar units are divide into the two radar units constituting the combination, and the remaining one radar unit. For example, the case where the wide-angle radar devices of Modification 2 of the first embodiment is configured by three radar units such as shown in FIG. 16(a) will be considered.

It is assumed that, in FIG. 16(a), in the second radar unit (#2), the interference signal from the first radar unit (#1) arrives in an arrival time Td21, and the interference signal from the third radar unit (#3) arrives in an arrival time Td23 through a geometric distance propagation. In this case, Exp. (22) holds among the distance R12 between the first radar unit and the second radar unit, the distance R23 between the second radar unit and the third radar unit, and the distance R13 between the first radar unit and the third radar unit. Therefore, it can be deemed that also Exp. (23) holds.

[Exp. 22]

$$R12 \approx R23 < R13 \qquad (22)$$

[Exp. 23]

$$Td21 \approx Td23 \qquad (23)$$

Therefore, the wide-angle radar device of Modification 2 of the first embodiment shown in FIG. 16(a) is configured by the group of the first radar unit and the third radar unit, and that of the second radar unit. In FIG. 16(a), namely, the radar units of the first group G1 are the first radar unit and the third radar unit, and similarly the radar unit of the second group G2 is only the second radar unit.

It is assumed that, in FIG. 16(b), in a first radar unit (#1), the interference signal from a second radar unit (#2) arrives in an arrival time Td12, and the interference signal from a fourth radar unit (#4) arrives in an arrival time Td14 through a geometric distance propagation. In this case, Exp. (24) holds among the distance R12 between the first radar unit and the second radar unit, the distance R14 between the first radar unit and the fourth radar unit, and the distance R13 between the first radar unit and the third radar unit. Therefore, it can be deemed that also Exp. (25) holds.

[Exp. 24]

$$R12 \approx R14 < R13 \quad (24)$$

[Exp. 25]

$$Td12 \approx Td14 \quad (25)$$

Therefore, the wide-angle radar device of Modification 2 of the first embodiment shown in FIG. 16(b) is configured by the group of the first radar unit and the third radar unit, and that of the second radar unit and the fourth radar unit. In FIG. 16(b), namely, the radar units of the first group G1 are the first radar unit and the third radar unit.

Similarly, the radar units of the second group G2 are the second radar unit and the fourth radar unit. Hereinafter, description will be made under assumption that the radar units and groups to which they belong have the above-described relationships. However, the relationships are not limited to the above.

In the wide-angle radar device of Modification 2 of the first embodiment, the radar units belonging to the first group G1 transmit the radar transmission signal based on the first transmission trigger signal in the wide-angle radar device 10 of the above-described first embodiment. By contrast, the radar units belonging to the second group G2 transmit the radar transmission signal based on the second transmission trigger signal in the wide-angle radar device 10 of the above-described first embodiment.

In the case where a plurality of radar units belong to the same group, the transmission timings of the radar transmission signals in the radar units are identical to each other. Furthermore, the interference signal between radar units belonging to the same group must be suppressed. In the case where a plurality of radar units belong to the same group, therefore, the radar units transmit radar transmission signals by using different frequency bands (FDM: Frequency Division Multiplexing), or radar transmission signals having high mutual orthogonality (CDM: Code Division Multiplexing).

Figure 17:
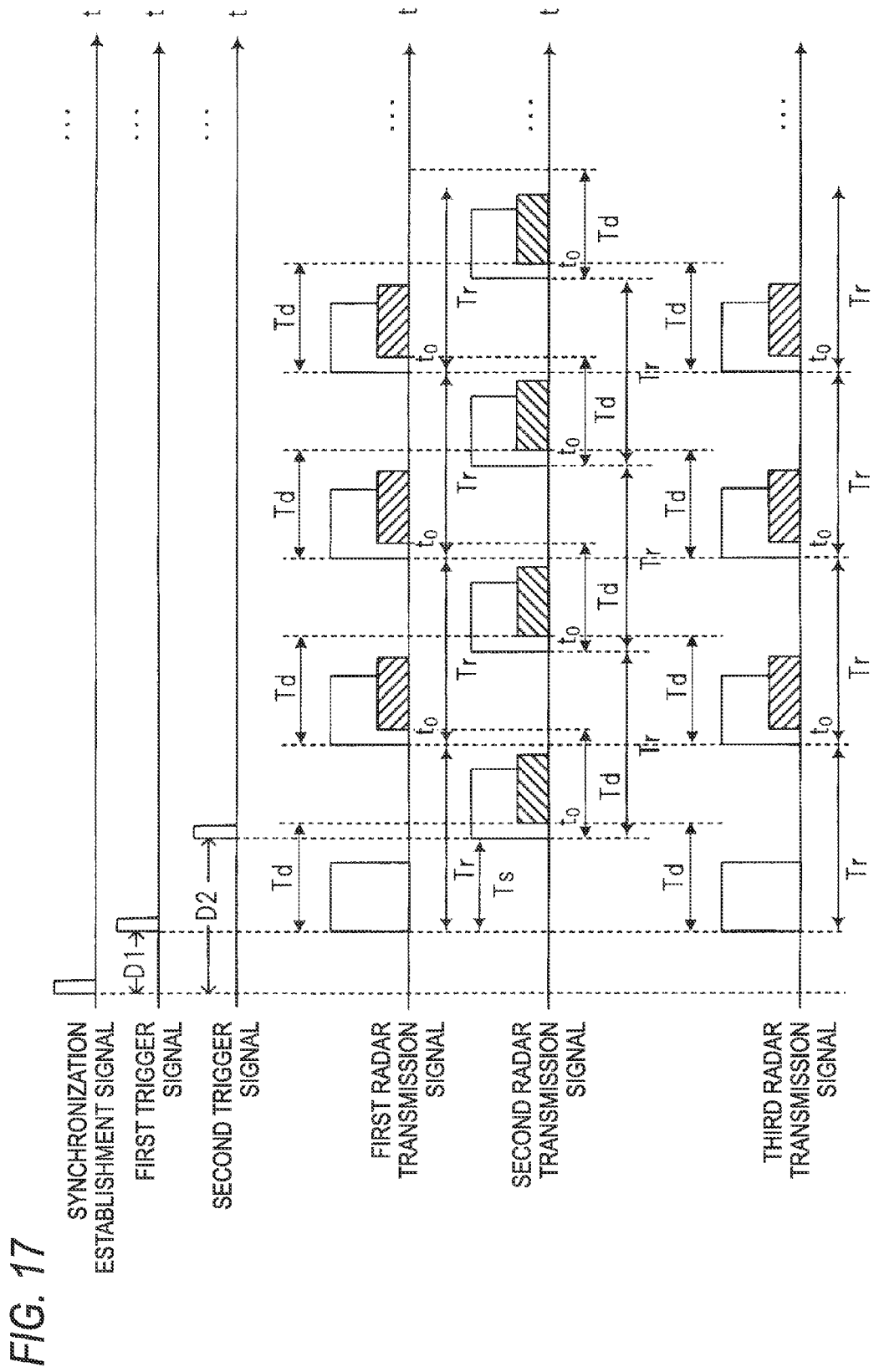
FIG. 17 is a timing chart related to the operations of the radar units in the case where the number of the radar units is three.
Figure 18:
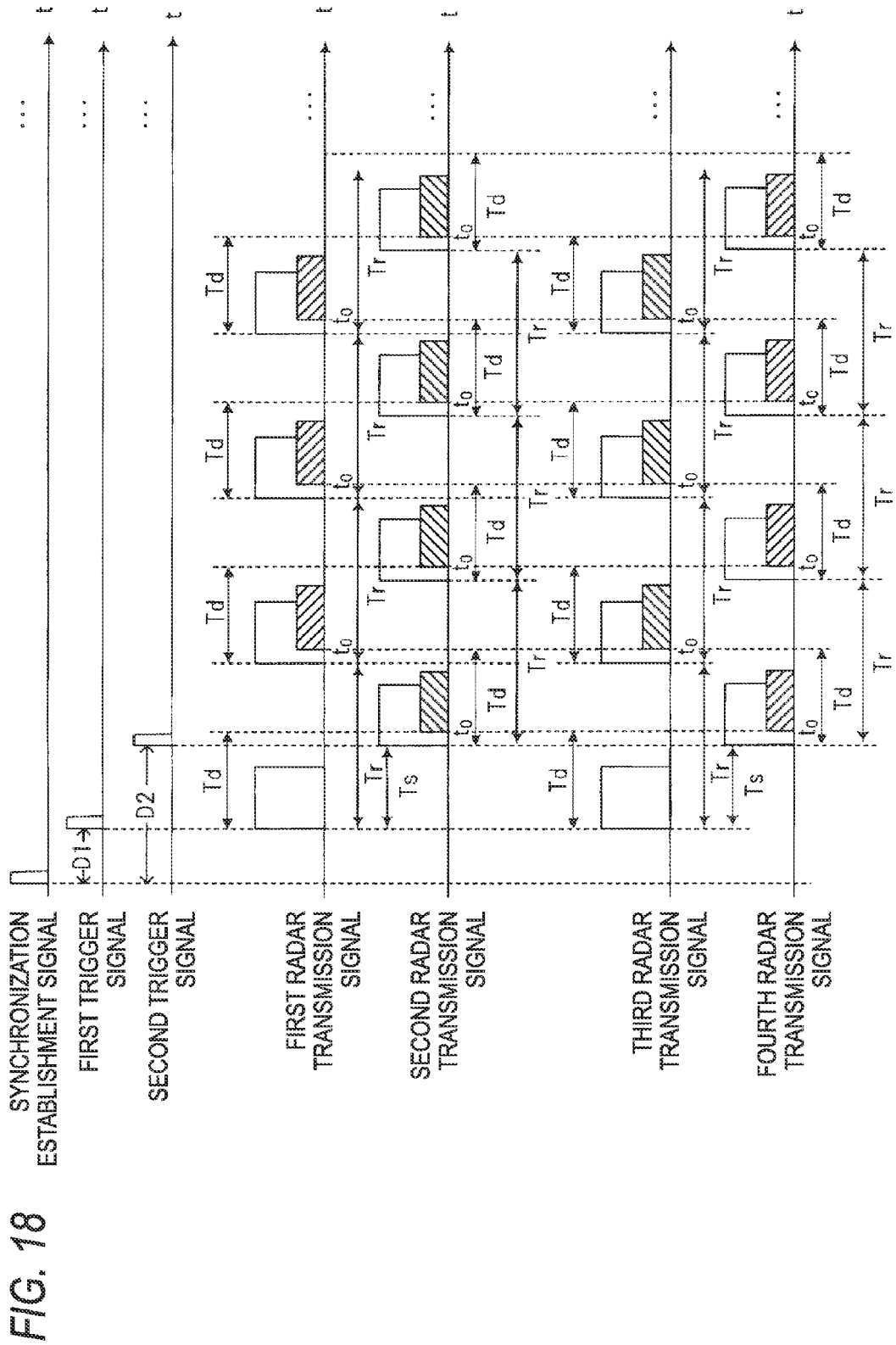
FIG. 18 is a timing chart related to the operations of the radar units in the case where the number of the radar units is four.

FIG. 17 is a timing chart related to the operations of the radar units in the case where the number of the radar units is three. FIG. 18 is a timing chart related to the operations of the radar units in the case where the number of the radar units is four. The configurations of the radar units shown in FIG. 16 are similar to the configuration of the first radar unit 11 or second radar unit 11a of the wide-angle radar device 10 of the above-described first embodiment.

In FIG. 17 or 18, the first transmission trigger signal producing section of the first radar unit produces the first transmission trigger signal after elapse of the delay time period D1 (in the case where the radar unit belongs to the first group G1) specific to the group to which the first radar unit belongs, from the detection or reception of the synchronization establishment signal by the inter-radar synchronization establishment signal detecting section.

Moreover, the second transmission trigger signal producing section of the second radar unit produces the second transmission trigger signal after elapse of the delay time period D2 (in the case where the radar unit belongs to the second group G2) specific to the group to which the second radar unit belongs, from the detection or reception of the synchronization establishment signal by the inter-radar synchronization establishment signal detecting section.

In FIG. 17 or 18, the third transmission trigger signal producing section of the third radar unit produces the first transmission trigger signal after elapse of the delay time period D1 (in the case where the radar unit belongs to the first group G1) specific to the group to which the third radar unit belongs, from the detection or reception of the synchronization establishment signal by the inter-radar synchronization establishment signal detecting section.

In FIG. 18, moreover, the fourth transmission trigger signal producing section of the fourth radar unit produces the fourth transmission trigger signal after elapse of the delay time period D2 (in the case where the radar unit belongs to the second group G2) specific to the group to which the fourth radar unit belongs, from the detection or reception of the synchronization establishment signal by the inter-radar synchronization establishment signal detecting section.

The first transmission code controlling section of the first radar unit controls the first radar transmitting section of the first radar unit belonging to the first group G1, so as to produce the first radar transmission signal based on the first transmission trigger signal.

The second transmission code controlling section of the second radar unit controls the second radar transmitting section of the second radar unit belonging to the second group G2, so as to produce the second radar transmission signal based on the second transmission trigger signal.

The third transmission code controlling section of the third radar unit controls the third radar transmitting section of the third radar unit belonging to the first group G1, so as to produce the third radar transmission signal based on the first transmission trigger signal.

The fourth transmission code controlling section of the fourth radar unit controls the fourth radar transmitting section of the fourth radar unit belonging to the second group G2, so as to produce the fourth radar transmission signal based on the second transmission trigger signal.

The first transmission trigger signal, the second transmission trigger signal, and the arrival time periods Td and adjustment time periods Ts of the interference signals of the other radar units are identical with the contents in the wide-angle radar device 10 of the above-described first embodiment. Therefore, description of the contents is omitted.

In the wide-angle radar device of Modification 2 of the first embodiment, as described above, a group is formed by a combination of radar units in which the arrival time periods Td of the interference signals are equal or relatively similar to each other, or that of radar units in which the distances between the radar units are equal or relatively similar to each other. Between the groups, the first transmission trigger signal, second transmission trigger signal, and arrival time periods Td and adjustment time periods Ts of the interference signals of the other radar units in the above-described first embodiment are applied.

In the wide-angle radar device of Modification 2 of the first embodiment, in the case where a plurality of radar units belong to the same group, moreover, the radar units transmit radar transmission signals by using different frequency bands, or radar transmission signals having high mutual orthogonality.

In the wide-angle radar device of Modification 2 of the first embodiment, as compared to orthogonalization between radar units in which only conventional CDM or FDM is used, therefore, the number of code multiplexes or that of frequency divisions can be further reduced by adjusting the adjustment time periods Ts of the transmission periods of the radar units, and the interference signal can be suppressed.

In the wide-angle radar device of Modification 2 of the first embodiment, when both adjustment of the adjustment time periods Ts of the transmission periods of the radar units, and CDM are concurrently used, therefore, the code length can be made shorter than that in the case of conventional CDM. In the wide-angle radar device of Modification 2 of the first embodiment, moreover, the increase of the measurement time period is small, and also the reception dynamic range required for receiving the reception signal can be reduced.

In the wide-angle radar device of Modification 2 of the first embodiment, when both adjustment of the adjustment time periods Ts of the transmission periods of the radar units, and FDM are concurrently used, therefore, the number of frequency divisions in a predetermined available frequency band can be made smaller than that in the case of conventional FDM. In the wide-angle radar device of Modification 2 of the first embodiment, moreover, the time resolution in measurement can be enhanced.

[Modification 3 of First Embodiment]

Radar units constituting a wide-angle radar device of Modification 3 of the first embodiment use the radar transmission signal among the radar units, whereby the arrival time period Td of the interference signal is measured, the adjustment time period Ts set, and synchronization is established between the radar units.

Figure 19:
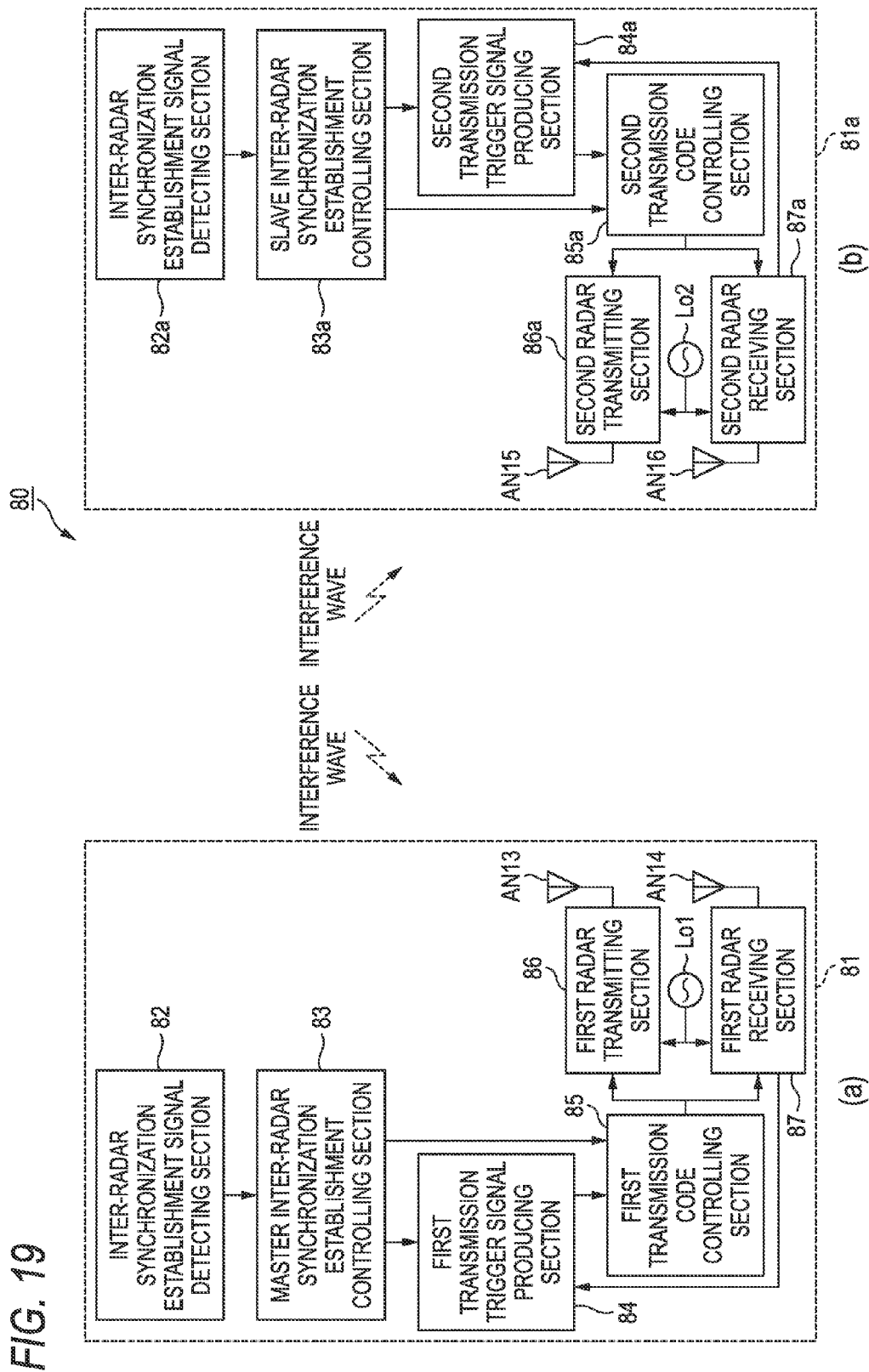
FIG. 19 is a system diagram showing the configurations of radar units in a wide-angle radar device of Modification 3 of the first embodiment.
Figure 20:
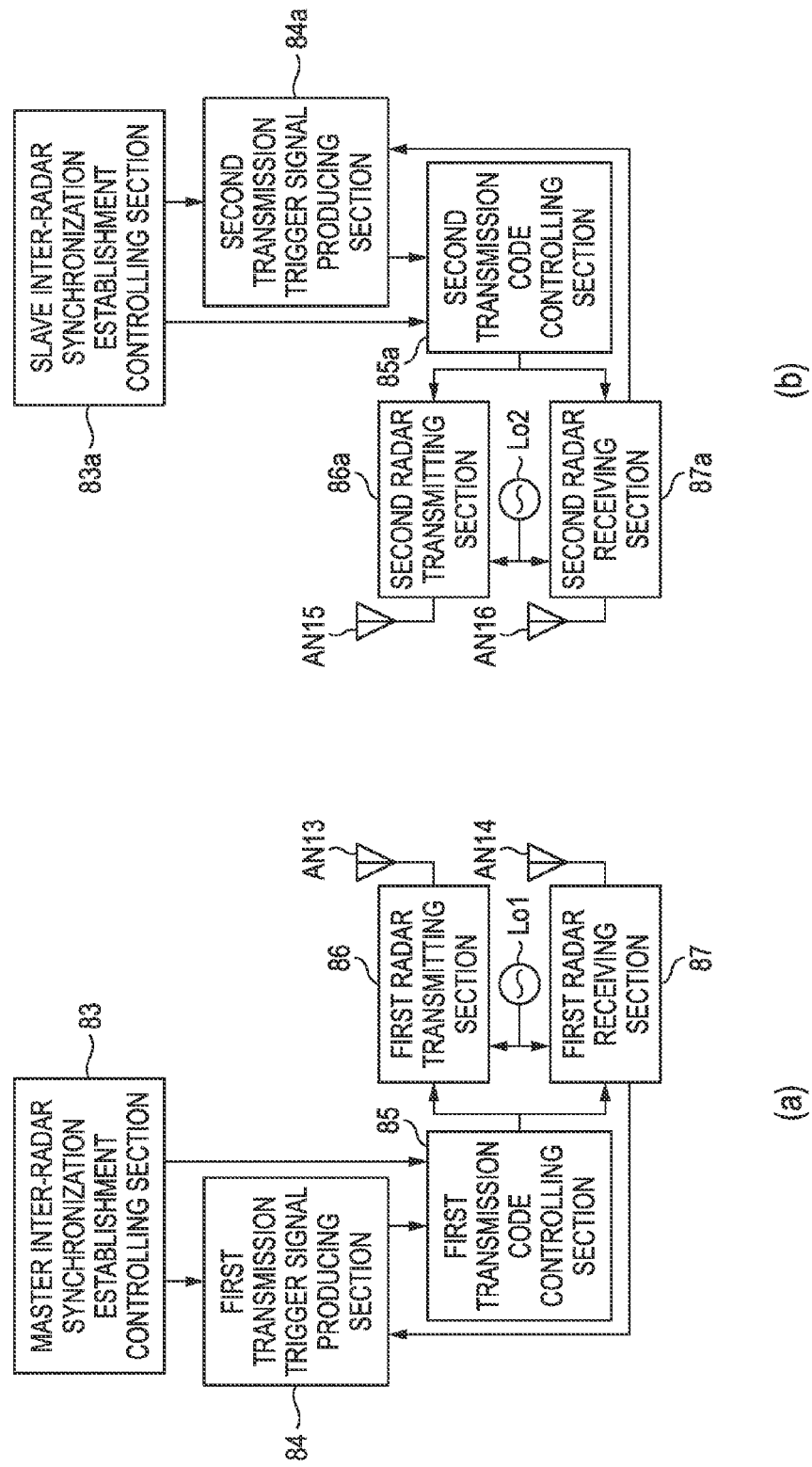
FIG. 20 shows block diagrams showing the internal configurations of the radar units of the wide-angle radar device of Modification 3 of the first embodiment, (a) shows a first radar unit, and (b) shows a second radar unit.
Figure 21:
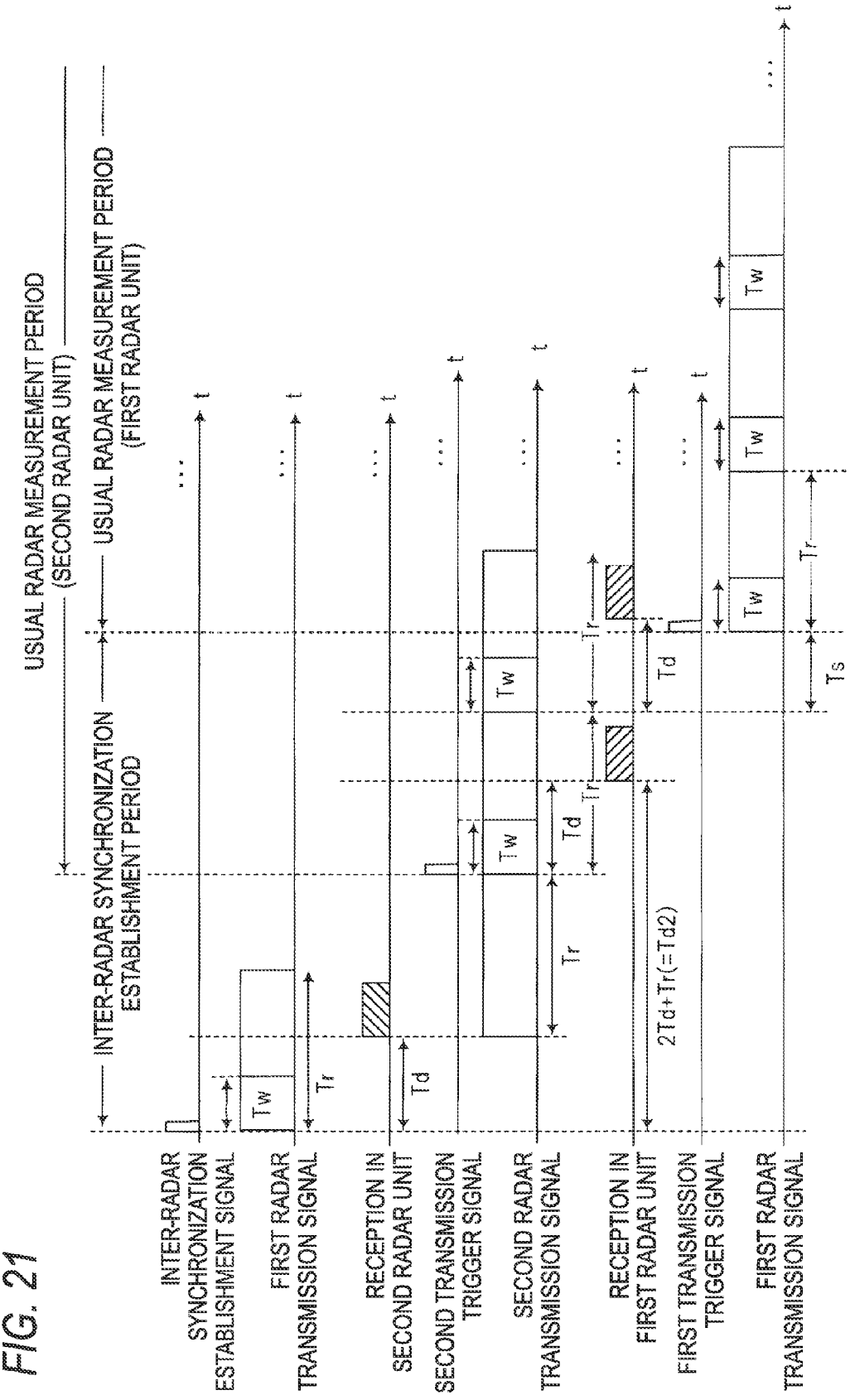
FIG. 21 is a timing chart illustrating operations of establishing synchronization between the radar units of the radar units in the wide-angle radar device of Modification 3 of the first embodiment.

FIG. 19 is a system diagram showing the configurations of radar units in the wide-angle radar device 80 of Modification 3 of the first embodiment. FIG. 20 shows block diagrams showing the internal configurations of the radar units of the wide-angle radar device 80 of Modification 3 of the first embodiment. In the figure, (a) shows a first radar unit 81, and (b) shows a second radar unit 81a. The views of FIG. 21 independently operate as radar units, respectively. FIG. 21 is a timing chart illustrating operations of establishing synchronization between the radar units of the radar units in the wide-angle radar device 80 of Modification 3 of the first embodiment.

The wide-angle radar device 80 of Modification 3 of the first embodiment includes the first radar unit 81 and the second radar unit 81a.

The first radar unit 81 includes an inter-radar synchronization establishment signal detecting section 82, a master inter-radar synchronization establishment controlling section 83, a first transmission trigger signal producing section 84, a first transmission code controlling section 85, a first radar transmitting section 86 to which a transmission antenna AN13 is connected, and a first radar receiving section 87 to which a reception antenna AN14 is connected.

The second radar unit 81a includes an inter-radar synchronization establishment signal detecting section 82a, a slave inter-radar synchronization establishment controlling section 83a, a second transmission trigger signal producing section 84a, a second transmission code controlling section 85a, a second radar transmitting section 86a to which a transmission antenna AN15 is connected, and a second radar receiving section 87a to which a reception antenna AN16 is connected.

The first radar unit 81 and the second radar unit 81a have a similar configuration, and operate in a similar manner. In the following description of the configuration and operation of the wide-angle radar device 80, therefore, the configuration and operation of the first radar unit 81 will be mainly described, and those of the second radar unit 81a will be described as required.

In the configuration of the second radar unit 81a, particularly, portions which are not explicitly described operate similarly as the description of the corresponding configuration of the first radar unit 81.

The inter-radar synchronization establishment signal detecting section 82 detects or receives an inter-radar synchronization establishment signal which instructs transition to an inter-radar synchronization establishment period between the first radar unit 81 and the second radar unit 81a. Although not illustrated, as the synchronization establishment signal, for example, a transmission signal which is transmitted from a specific base station apparatus or the like via a wired communication line such as a LAN (Local Area Network), or a wireless communication line, or that which is transmitted via a GPS (Global Positioning System) satellite may be used.

The master inter-radar synchronization establishment controlling section 83 is possessed by one radar unit of a plurality of radar units constituting the wide-angle radar device 80. In FIG. 19, the first radar unit 81 possesses the master inter-radar synchronization establishment controlling section 83.

The master inter-radar synchronization establishment controlling section 83 controls the first transmission code controlling section 85 so as to transmit and receive the radar transmission signal during an inter-radar synchronization establishment period which is different from a usual radar transmission period (measurement period).

The slave inter-radar synchronization establishment controlling section 83a is possessed by a radar unit which is one of the plurality of radar units constituting the wide-angle radar device 80, and which is different from the radar unit that is used as the master. In FIG. 19, the second radar unit 81a possesses the slave inter-radar synchronization establishment controlling section 83a.

The slave inter-radar synchronization establishment controlling section 83a controls the second transmission code controlling section 85a so as to transmit and receive the radar transmission signal during the inter-radar synchronization establishment period which is different from the usual radar transmission period (measurement period).

The first transmission trigger signal producing section 84 produces the first transmission trigger signal during the inter-radar synchronization establishment period based on the measurement result of the arrival time period Td of the interference signal from the second radar unit 81a.

The second transmission trigger signal producing section 84a produces the second transmission trigger signal during the inter-radar synchronization establishment period based on the measurement result of the arrival time period Td of the interference signal from the first radar unit 81.

Next, the operation of the wide-angle radar device 80 of Modification 3 of the first embodiment which is performed until transition from the inter-radar synchronization establishment period to the usual radar measurement period will be described with reference to FIG. 15.

The master inter-radar synchronization establishment controlling section 83 and the slave inter-radar synchronization establishment controlling section 83a control the operations of the first and second transmission trigger signal producing sections 84, 84a so as to transition to the inter-radar synchronization establishment period in accordance with reception of the inter-radar synchronization establishment signal by the inter-radar synchronization establishment signal detecting sections 82, 82a.

The master inter-radar synchronization establishment controlling section 83 controls the first transmission code controlling section 85 so as to, based on the inter-radar synchronization establishment signal, transmit the first radar transmission signal in a predetermined number Nm (in FIG. 21, Nm=1) of transmission periods Tr.

By contrast, based on the inter-radar synchronization establishment signal, the slave inter-radar synchronization establishment controlling section 83a controls the second transmission code controlling section 85a so as to stop the transmission of the second radar transmission signal.

Furthermore, after the reception of the inter-radar synchronization establishment signal, the slave inter-radar synchronization establishment controlling section 83a controls the second transmission code controlling section 85a so as to detect the interference signal of the first radar transmission signal transmitted from the first radar unit 81, in the predetermined number Nm of transmission periods Tr.

Furthermore, the slave inter-radar synchronization establishment controlling section 83a outputs a detection result indicating that the interference signal (arrival time period Td) is detected, to the second transmission trigger signal producing section 84a.

The second transmission trigger signal producing section 84a receives the detection result of the interference signal output from the slave inter-radar synchronization establishment controlling section 83a. The second transmission trigger signal producing section 84a produces the second transmission trigger signal after elapse of an integer K (in FIG. 2, K=1) multiple of the transmission period Tr from the start of the received interference signal. As a result of the production of the second transmission trigger signal, the second radar unit 81a transitions to the usual radar transmission period.

The master inter-radar synchronization establishment controlling section 83 controls the first transmission code controlling section 85 so as to, after the second radar unit 81 transmits the first radar transmission signal during a predetermined number Nm of transmission periods Tr, stop the transmission of the first radar transmission signal.

After the reception of the inter-radar synchronization establishment signal, moreover, the master inter-radar synchronization establishment controlling section 83 controls the first transmission code controlling section 85 so as to detect the interference signal of the second radar transmission signal transmitted from the second radar unit 81a which has transitioned to the usual radar transmission period, during a predetermined number Nm2 of transmission periods Tr.

Furthermore, the master inter-radar synchronization establishment controlling section 83 outputs a detection result indicating that the interference signal (arrival time period Td2) is detected, to the first transmission trigger signal producing section 84.

The first transmission trigger signal producing section 84 receives the detection result of the interference signal output from the slave inter-radar synchronization establishment controlling section 83a. The first transmission trigger signal producing section 84 derives the arrival time period Td assuming that, with respect to the arrival time period Td2 of the received interference signal, Exp. (26) holds because of the duality of propagation paths.

[Exp. 26]

$$Td2 = Td + KTr + Td \quad (26)$$

The first transmission trigger signal producing section 84 sets the adjustment time period Ts by using the derived the arrival time period Td so as to satisfy Exp. (7). In the case where the derived arrival time period Td satisfies Exp. (15), alternatively, the first transmission trigger signal producing section 84 sets the adjustment time period Ts as indicated in Exp. (16), and produces the first transmission trigger signal.

As a result of the production of the first transmission trigger signal, the first radar unit 81 transitions to the usual radar transmission period.

The operations of the first radar unit 81 and the second radar unit 81a after the first radar unit 81 transitions to the usual radar transmission period are similar to those of the first radar unit 11 and second radar unit 11a of the wide-angle radar device 10 of the above-described first embodiment. Therefore, the description of the operations of the first radar unit 81 and the second radar unit 81a after the first radar unit 81 transitions to the usual radar transmission period is omitted.

As a result, the wide-angle radar device 80 of Modification 3 of the first embodiment measures the arrival time period of the interference signal from the other radar unit based on the radar transmission signals of the radar units, and sets the adjustment time period Ts. According to the wide-angle radar device 80 of Modification 3 of the first embodiment, therefore, the interference signal from the other radar unit can be adaptively suppressed in accordance with the peripheral situations of the radar units which are placed in the actual environment.

According to the wide-angle radar device 80 of Modification 3 of the first embodiment, furthermore, the radar units transmit the same radar transmission signal (pulse compression code), so that establishment of inter-radar synchronization can be realized without adding additional circuits such as a code producing section and a correlation value calculating section.

[Modification 4 of First Embodiment]

In the above-described embodiments, the operations of the wide-angle radar devices on the assumption of synchronization of transmission timings between radar units have been described.

In Modification 4 of the first embodiment, the configuration and operation of a wide-angle radar device in which, even when the configuration for establishing synchronization of transmission timings between radar units is eliminated, the interference signal from another radar unit can be suppressed will be described.

Figure 22:
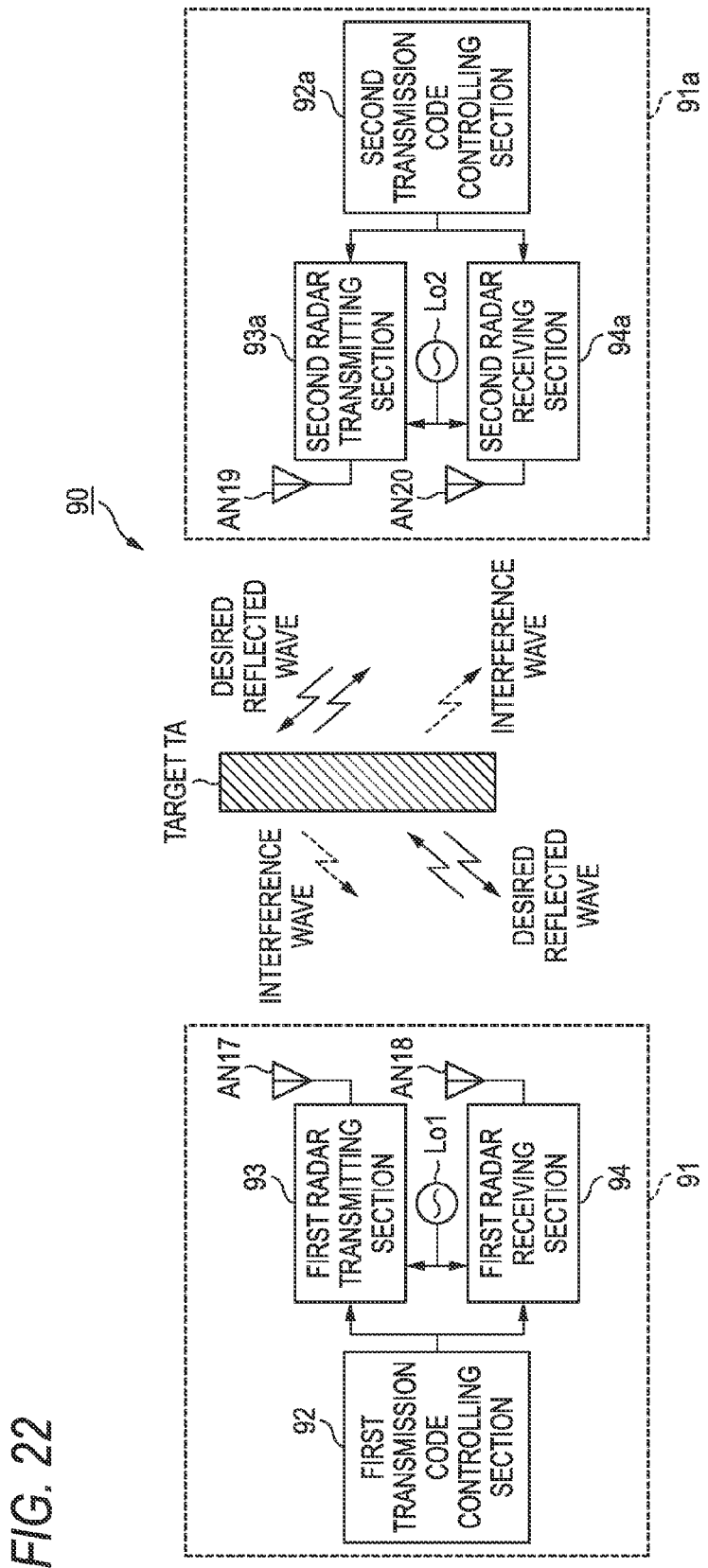
FIG. 22 is a system diagram showing the configurations of radar units in a wide-angle radar device of Modification 4 of the first embodiment.
Figure 23:
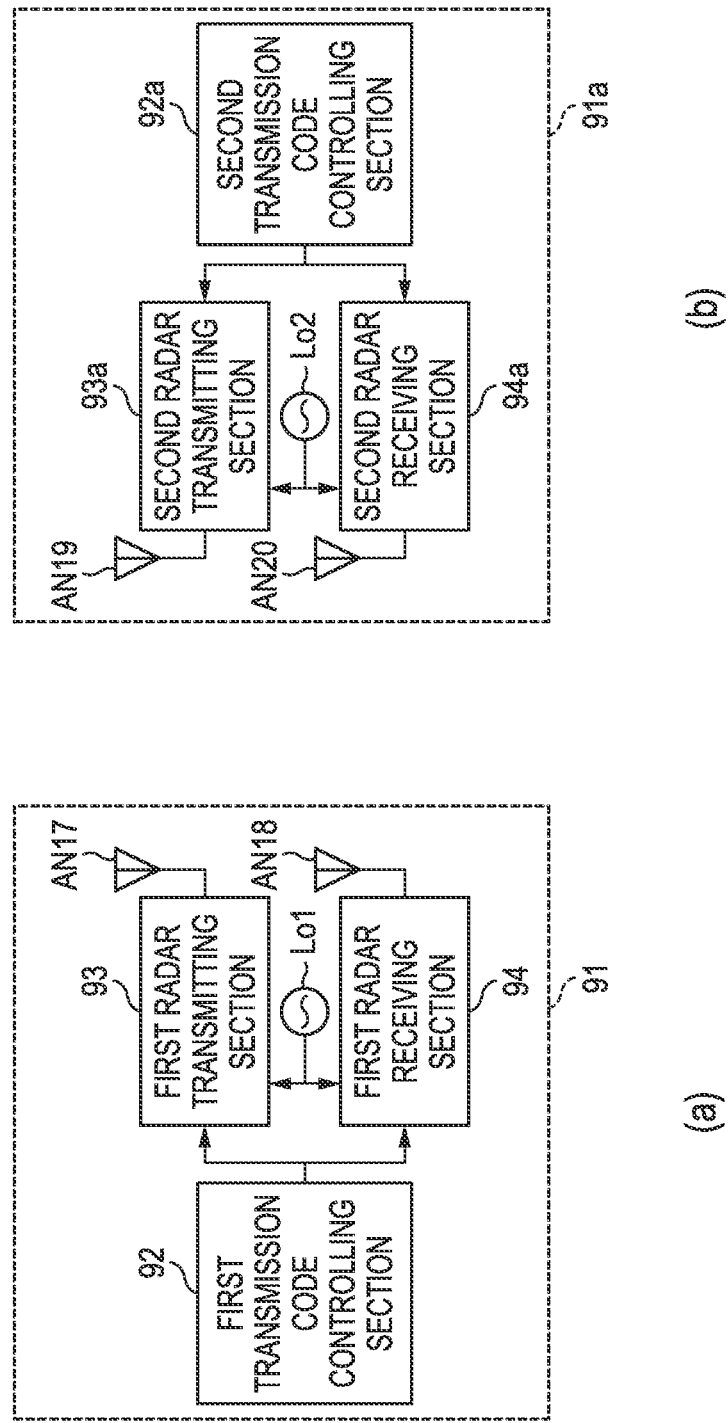
FIG. 23 shows block diagrams showing the internal configurations of the radar units of the wide-angle radar device of Modification 4 of the first embodiment, (a) shows a first radar unit, and (b) shows a second radar unit.

FIG. 22 is a system diagram showing the configuration of radar units in a wide-angle radar device 90 of Modification 4 of the first embodiment. FIG. 23 shows block diagrams showing the internal configurations of the radar units of the wide-angle radar device 90 of Modification 4 of the first embodiment. In the figure, (a) shows a first radar unit 91, and (b) shows a second radar unit 91a. The views of FIG. 23 independently operate as radar devices, respectively. FIG. 24 is a timing chart illustrating the operations of the radar units in the wide-angle radar device 90 of Modification 4 of the first embodiment.

The wide-angle radar device 90 of Modification 4 of the first embodiment includes the first radar unit 91 and the second radar unit 91a.

The first radar unit 91 includes a first transmission code controlling section 92, a first radar transmitting section 93 to which a transmission antenna AN17 is connected, and a first radar receiving section 94 to which a reception antenna AN18 is connected.

The second radar unit 91a includes a second transmission code controlling section 92a, a second radar transmitting section 93a to which a transmission antenna AN19 is connected, and a second radar receiving section 94a to which a reception antenna AN20 is connected.

The first transmission code controlling section 92 controls the first radar transmitting section 93 so as to transmit a first radar transmission signal (pulse compression code) with a transmission period Tr3.

The second transmission code controlling section 92a controls the second radar transmitting section 93a so as to transmit a second radar transmission signal (pulse compression code) with a transmission period Tr4.

The configurations and operations of the first radar transmitting section 93, the first radar receiving section 94, the second radar transmitting section 93a, and the second radar receiving section 94a are similar to those of the first radar transmitting section 15, first radar receiving section 16, second radar transmitting section 15a, and second radar receiving section 16a in the wide-angle radar device 10 of the above-described first embodiment.

In the following description, with respect to the configurations and operations of the first radar transmitting section 93, the first radar receiving section 94, the second radar transmitting section 93a, and the second radar receiving section 94a, contents which are different from the first radar transmitting section 15, first radar receiving section 16, second radar transmitting section 15a, and second radar receiving section 16a in the wide-angle radar device 10 will be described.

In the wide-angle radar device 90 of Modification 4 of the first embodiment, Exp. (27) holds between the transmission period Tr3 of the first radar transmission signal and the transmission period Tr4 of the second radar transmission signal. The parameter Tw indicates the transmission zones of the first radar transmission signal and the second radar transmission signal, and the arrival time period of the interference signal.

[Exp. 27]

$$|Tr3-Tr4|>Tw \quad (27)$$

FIG. 24 shows the case where the arrival time period (interference region) when the interference signal from another radar unit arrives is equal to the transmission zones Tw of the first radar transmission signal and the second radar transmission signal. In the case where the interference signal from the other radar unit further contains a delay wave, however, the transmission periods Tr3 and tr4 which satisfy Exp. (28) are set by using the time width Tm of the interference region containing the delay wave.

[Exp. 28]

$$|Tr3-Tr4|>Tm \quad (28)$$

In the wide-angle radar device 90 of Modification 4 of the first embodiment, when the transmission period indicated in Exp. (27) or Exp. (28) is set, the interference regions of the first radar transmission signal and the second radar transmission signal change without overlapping each other, for each transmission period Tr3 or tr4.

As a result, in the wide-angle radar device 90 of Modification 4 of the first embodiment, the radar units transmit the radar transmission signals (pulse compression codes) with different transmission periods, whereby, by means of additional averaging in each transmission period, interference is randomized within the transmission period.

In the wide-angle radar device 90 of Modification 4 of the first embodiment, therefore, impairment of the SINR in a specific measurement time period can be prevented from occurring. Specifically, for the second radar unit which functions as a specific radar, the interference region of the interference signal from the first radar unit does not exist in the transmission period Tr4 of the second radar unit, and the SINR with respect to the reception signal level of the second radar unit in the transmission period Tr4 can be enhanced.

Although various embodiments have been described with reference to the drawings, it is a matter of course that the radar device of the invention is not restricted to the examples. It is obvious to those skilled in the art that various changes and modifications can be made within the scope of the appended claims, and it is to be understood that they naturally belong to the technical scope of the invention.

In the above-described embodiments, the A/D converting sections 22, 23 convert the in-phase signal and quadrate signal output from the quadrature detecting section 20 of the reception RF section 17, to digital data by oversampling corresponding to the discrete time k. However, the A/D converting sections 22, 23 may not perform A/D conversion at the same sampling rate as the base-band transmission signal in the radar transmitting section 2.

In the radar transmitting sections in the above-described embodiments, for example, the base-band transmission signal is produced by using the sample number of Nr for the code length of L. This corresponds to oversampling of Nr/L samples per code. In the radar receiving sections in the above-described embodiments, even in the case of one time sample or more per code, however, the signal process on the reception signal is enabled.

The application is based on Japanese Patent Application (No. 2010-256143) filed on Nov. 16, 2010, and the contents of which are incorporated herein by reference.

INDUSTRIAL APPLICABILITY

The invention is useful as a radar device in which, with respect to the reception signal level of the own radar unit, the level of an interference signal from another radar unit is effectively suppressed, and the measurement time period and additional circuit that are required for the suppression are prevented from being increased.

DESCRIPTION OF REFERENCE NUMERALS AND SIGNS 10, 80, 90 wide-angle radar device
11, 41, 81, 91 first radar unit
11a, 41a, 81a, 91a second radar unit
12, 12a, 42, 82, 82a inter-radar synchronization establishment signal detecting section
13, 43, 84 first transmission trigger signal producing section
14, 44, 85, 92 first transmission code controlling section
15, 45, 86, 93 first radar transmitting section
16, 46, 87, 94 first radar receiving section
13a, 84a second transmission trigger signal producing section
14a, 85a, 92a second transmission code controlling section
15a, 86a, 93a second radar transmitting section
16a, 87a, 94a second radar receiving section
17, 47 first transmission signal producing section
18 code producing section
19, 51 modulating section
20, 52 LPF
21 transmission RF section
22, 27, 54, 61 frequency converting section
23, 26, 55, 60 amplifier
24, 58 reception RF section
25 signal processing section
28, 62 quadrature detecting section 29, 30, 64, 65 A/D converting section
31 correlation value calculating section
32 addition processing section
33, 71 arrival distance estimating section
48 first code producing section
49 second code producing section
50 code switching section
56, 57 antenna switching section
66 first correlation value calculating section
67 second correlation value calculating section
68 output switching section
69 first addition processing section
70 second addition processing section
83 master inter-radar synchronization establishment controlling section
83a slave inter-radar synchronization establishment controlling section
AN1, AN3, AN5, AN6, AN13, AN15, AN17, AN19 transmission antenna
AN2, AN4, AN7, AN8, AN14, AN16, AN18, AN20 reception antenna
Lo1, Lo2 reference signal oscillator
TA target
Td arrival time period
Tr, Tr1, Tr2, Tr3, Tr4 transmission period
Ts adjustment time period
Tw transmission zone

The invention claimed is:

1. A radar transmission method comprising:
generating a first transmission trigger signal after elapse of a first delay time period from reception of a predetermined synchronization establishment signal;
providing a first control signal to generate a first radar transmission signal for a first transmission period based on the first transmission trigger signal;
periodically generating and transmitting the first radar transmission signal from a first radar transmitter based on the first control signal;
generating a second transmission trigger signal after elapse of a second delay time period from reception of the predetermined synchronization establishment signal;
providing a second control signal to generate a second radar transmission signal for a second transmission period based on the second transmission trigger signal; and
periodically generating and transmitting the second radar transmission signal from a second radar transmitter based on the second control signal,
wherein in the providing of the second control signal to generate the second radar transmission signal, in accordance with the second delay time period, an adjustment time period Ts is adjusted to receive an arrival timing t0 of an interference signal from the first radar transmitter within a transmission zone Tw of the second radar transmission signal, the adjustment time period Ts being a transmission timing of the second radar transmission signal; and
wherein in the periodically generating and transmitting of the second radar transmission signal, the second radar transmission signal is transmitted after elapse of the adjustment time period Ts from transmission of the first radar transmission signal.

2. The radar transmission method according to claim 1, comprising:
calculating the arrival timing t0 of the interference signal from the first radar transmitter based on a distance between a first radar unit that includes the first radar transmitter and a second radar unit that includes the second radar transmitter.

3. The radar transmission method according to claim 2, wherein the calculating of the arrival timing t0 of the interference signal from the first radar transmitter includes dividing a distance Rd between the first radar transmitter and the second radar transmitter by a light speed C; and
wherein the adjustment time period Ts from transmission of the first radar transmission signal is a time period which is longer than a time period that is obtained by subtracting the transmission zone Tw of the first radar transmission signal from the arrival timing t0 of the interference signal from the first radar transmitter, and which is shorter than the arrival timing t0 of the interference signal from the first radar transmitter.

4. The radar transmission method according to claim 1, wherein the adjustment time period Ts corresponds to a half period of the first transmission period.

5. The radar transmission method according to claim 1, comprising:
receiving the predetermined synchronization establishment signal.

6. The radar transmission method according to claim 5, comprising:
generating a first transmission code having a first code length;
modulating the generated first transmission code; and
converting the modulated first transmission code to the first radar transmission signal, and periodically transmitting the first radar transmission signal with the first transmission period from a first transmission antenna.

7. The radar transmission method according to claim 6, comprising:
generating a second transmission code having a second code length;
modulating the generated second transmission code; and
converting the modulated second transmission code to the second radar transmission signal, and periodically transmitting the second radar transmission signal with the second transmission period from a second transmission antenna.

8. The radar transmission method according to claim 7, comprising:
receiving an interference signal from the second radar transmitter;
converting a signal of a reflected wave that is obtained by reflecting the first radar transmission signal from a target, and the interference signal from the second radar transmitter, to a base-band reception signal;
calculating a first correlation value between the base-band reception signal and a transmission signal that is identical with the first transmission code modulated by the first modulator;
averaging the calculated first correlation value during a predetermined number of first transmission periods; and
calculating an arrival distance of the target in accordance with a first average correlation value that is additionally averaged.

9. The radar transmission method according to claim 1, comprising:
generating a first transmission code having a first code length;
generating a second transmission code having a second code length which is longer than the first code length;

selecting the generated first transmission code or second transmission code;
modulating the selected first transmission code or second transmission code; and
converting the modulated first transmission code or second transmission code to the first radar transmission signal.

10. The radar transmission method according to claim 9, selectively switching a transmission antenna which transmits the converted first radar transmission signal, in accordance with the selected first transmission code or second transmission code.

11. The radar transmission method according to claim 9, comprising:
generating a third transmission code having a third code length;
generating a fourth transmission code having a fourth code length which is longer than the third code length;
selecting the generated third transmission code or fourth transmission code;
modulating the selected third transmission code or fourth transmission code; and
converting the modulated third transmission code or fourth transmission code to the second radar transmission signal.

12. The radar transmission method according to claim 11, comprising:
selectively switching a transmission antenna that transmits the converted second radar transmission signal, in accordance with the selected third transmission code or fourth transmission code.

13. The radar transmission method according to claim 1, comprising:
generating a third transmission trigger signal after elapse of the first delay time period from the reception of the predetermined synchronization establishment signal;
controlling generation of a third radar transmission signal for the first transmission period based on the generated third transmission trigger signal;
periodically transmitting the generated third radar transmission signal from a third radar transmitter;
receiving the interference signal from the first radar transmitter;
receiving the interference signal from the second radar transmitter;
wherein in a case where a distance between the first radar transmitter and the second radar transmitter is approximately equal to a distance between the second radar transmitter and the third radar transmitter and is shorter than a distance between the first radar transmitter and the third radar transmitter, setting the adjustment time period Ts which causes the arrival timing t0 of the interference signal from the first radar transmitter and an interference signal from the third radar transmitter to be within the transmission zone Tw of the second radar transmission signal; and
transmitting the second radar transmission signal from the second radar transmitter after elapse of the set adjustment time period Ts from the transmissions of the first radar transmission signal and the third radar transmission signal.

14. The radar transmission method according to claim 13, comprising:
calculating the arrival timing t0 of the interference signals from the first radar transmitter and the third radar transmitter based on the distances between the first radar transmitter and the second radar transmitter and between the third radar transmitter and the second radar transmitter.

15. The radar transmission method according to claim 1, comprising:
generating a third transmission trigger signal after elapse of the first delay time period from the reception of the predetermined synchronization establishment signal;
controlling generation of a third radar transmission signal for the first transmission period based on the generated third transmission trigger signal;
periodically transmitting the generated third radar transmission signal from a third radar transmitter;
generating a fourth transmission trigger signal after elapse of the second delay time period from the reception of the predetermined synchronization establishment signal;
controlling generation of a fourth radar transmission signal for the second transmission period based on the generated fourth transmission trigger signal;
periodically transmitting the generated fourth radar transmission signal from a fourth radar transmitter;
receiving the interference signal from the first radar transmitter, an interference signal from the second radar transmitter, an interference signal from the third radar transmitter, and an interference signal from the fourth radar transmitter;
wherein in a case where a distance between the first radar transmitter and the second radar transmitter is approximately equal to a distance between the first radar transmitter and the fourth radar transmitter and is shorter than a distance between the first radar device and the third radar transmitter, setting the adjustment time period Ts which causes the arrival timing t0 of the interference signals from the first radar transmitter and the third radar transmitter to be within the transmission zone Tw of the second radar transmission signal and the fourth radar transmission signal; and
transmitting the second radar transmission signal from the second radar transmitter and the fourth radar transmission signal from the fourth radar transmitter after elapse of the set the adjustment time period Ts from the transmissions of the first radar transmission signal and the third radar transmission signal, respectively.

16. The radar transmission method according to claim 15, calculating the arrival timing t0 of the interference signals from the first radar transmitter and the third radar transmitter based on the distances between the first radar transmitter and the second radar transmitter and between the third radar transmitter and the second radar transmitter.

17. The radar transmission method according to claim 1, comprising:
controlling transmission of the first radar transmission signal from the first radar transmitter during a predetermined number of first transmission periods in accordance with a predetermined inter-radar synchronization establishment signal; and
controlling detection of the first radar transmission signal transmitted from the first radar transmitter from the reception from the predetermined inter-radar synchronization establishment signal, during the predetermined number of second transmission periods,
wherein the generating of the second transmission trigger signal includes generating the second transmission trigger signal after elapse of the second delay time period from arrival of the detected first radar transmission signal.

\* \* \* \* \*